US012632491B1

(12) United States Patent
Yu et al.

(10) Patent No.: US 12,632,491 B1
(45) Date of Patent: May 19, 2026

(54) MULTI-MODAL KNOWLEDGE RETRIEVAL SYSTEM WITH GRAPH-CONSTRAINED SEMANTIC SEARCH

(71) Applicant: BibleX.AI, Inc., Springfield, MO (US)

(72) Inventors: Jay Yu, Encinitas, CA (US); Marc Turnage, Springfield, MO (US)

(73) Assignee: BibleX.AI, Inc., Springfield, MO (US)

( * ) Notice: Subject to any disclaimer, the term of this patent is extended or adjusted under 35 U.S.C. 154(b) by 0 days.

(21) Appl. No.: 19/315,017

(22) Filed: Aug. 29, 2025

(51) Int. Cl.
| | |
|---|---|
| *G06F 16/30* | (2019.01) |
| *G06F 16/334* | (2025.01) |
| *G06F 16/383* | (2019.01) |
| *G06F 16/901* | (2019.01) |

(52) U.S. Cl.
CPC ........ *G06F 16/383* (2019.01); *G06F 16/3347* (2019.01); *G06F 16/9024* (2019.01)

(58) Field of Classification Search
CPC . G06F 16/383; G06F 16/3347; G06F 16/9024
See application file for complete search history.

(56) References Cited

U.S. PATENT DOCUMENTS

| | | | | |
|---|---|---|---|---|
| 11,983,269 | B2 * | 5/2024 | Li | G06V 10/426 |
| 12,411,896 | B1 * | 9/2025 | Selman | G06F 16/90335 |
| 2016/0378805 | A1 * | 12/2016 | Hopcroft | G06F 16/2272 |
| | | | | 707/715 |
| 2024/0241909 | A1 * | 7/2024 | Chen | G06F 16/287 |
| 2024/0370479 | A1 * | 11/2024 | Hudetz | G06F 16/316 |
| 2024/0428086 | A1 * | 12/2024 | Karlberg | G06F 16/9024 |

(Continued)

FOREIGN PATENT DOCUMENTS

WO WO-2025171419 A2 * 8/2025 ......... G06F 16/3347

OTHER PUBLICATIONS

Article entitled "TigerVector: Supporting Vector Search in Graph Databases for Advanced RAGs", by Liu et al., dated May 3, 2025 (Year: 2025).*

(Continued)

*Primary Examiner* — Mahesh H Dwivedi
(74) *Attorney, Agent, or Firm* — Outlier Patent Attorneys, PLLC

(57) ABSTRACT

A computing system is disclosed for augmenting semantic retrieval using structured knowledge constraints. The system obtains content segments from one or more source documents and processes the content through a dual-indexing pipeline that generates vector embeddings and constructs a graph representation of inter-segment relationships. A vector index and a graph-based structure are maintained in parallel to support retrieval workflows. Upon receiving a search query, the system initiates vector-based retrieval to identify semantically similar segments and concurrently traverses the graph to identify contextually connected segments. Retrieved segments are cross-referenced using constraint resolution logic that evaluates identifier overlap, relationship proximity, and graph alignment metrics. The system adjusts relevance scores using adaptive weighting and structural validation and produces a unified ranking of content segments. Validated results may be presented for review, integrated into external applications, or refined through feedback signals that update scoring parameters and edge weights over time.

20 Claims, 11 Drawing Sheets

(56) References Cited

U.S. PATENT DOCUMENTS

| | | | | |
|---|---|---|---|---|
| 2025/0190479 A1* | 6/2025 | Kim | ...................... | G06F 16/383 |
| 2025/0231975 A1* | 7/2025 | DeGroot | .................. | G06N 5/02 |
| 2025/0307749 A1* | 10/2025 | Shah | ............... | G06Q 10/06315 |

OTHER PUBLICATIONS

Article entitled "Native Parallel Graphs", by Xu et al., dated 2018 (Year: 2018).*

Article entitled "VectorSearch: Enhancing Document Retrieval with Semantic Embeddings and Optimized Search", by Monir et al., dated Sep. 25, 2024 (Year: 2024).*

* cited by examiner

Adaptive Query Execution and Optimization System 148

| | | |
|---|---|---|
| User Device Interface 302 | Data Processing and Transformation System Interface 304 | Structured Data Management and Output System Interface 306 |
| Data Validation and Integrity System Interface 308 | Interaction Monitoring Module 310 | Query Construction Engine 312 |
| Vector Retrieval Engine 314 | Graph Traversal Engine 316 | Constraint Resolution Engine 318 |
| Unified Ranking Engine 320 | Response Synthesis Pipeline 322 | Feedback Incorporation Module 324 |
| User Interaction Datastore 330 | Query Response History Datastore 332 | Feedback Signal Datastore 334 |

FIG. 3

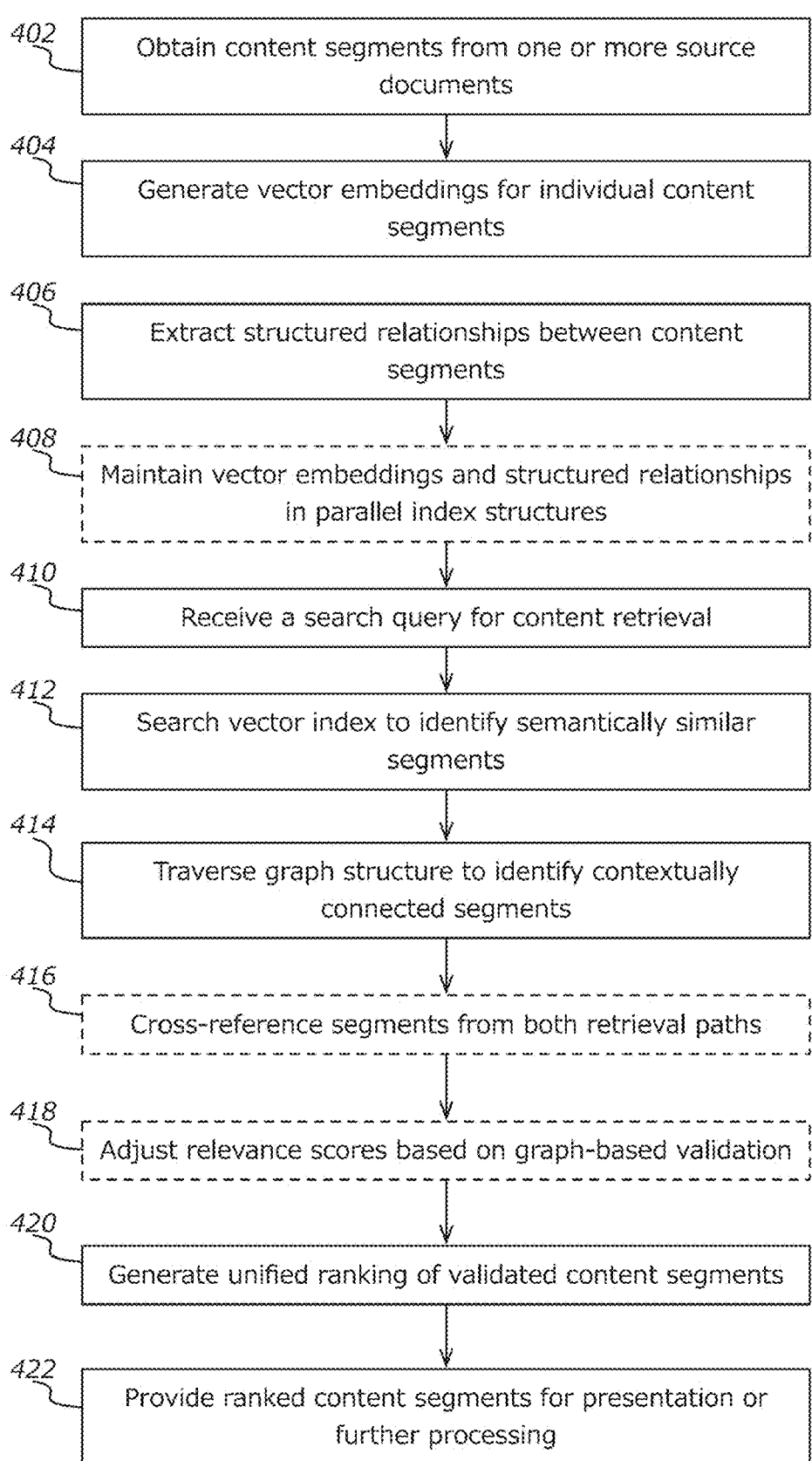

402   Obtain content segments from one or more source documents

404   Generate vector embeddings for individual content segments

406   Extract structured relationships between content segments

408   Maintain vector embeddings and structured relationships in parallel index structures 410   Receive a search query for content retrieval 412   Search vector index to identify semantically similar segments 414   Traverse graph structure to identify contextually connected segments 416   Cross-reference segments from both retrieval paths 418   Adjust relevance scores based on graph-based validation 420   Generate unified ranking of validated content segments 422   Provide ranked content segments for presentation or further processing

*FIG. 4*

MULTI-MODAL KNOWLEDGE RETRIEVAL SYSTEM WITH GRAPH-CONSTRAINED SEMANTIC SEARCH

FIELD OF THE ART

The systems and methods disclosed herein relate generally to data processing systems and, more specifically, to systems and methods for semantic retrieval using parallel indexing and structured relationship constraints.

BACKGROUND

Organizations increasingly rely on digital repositories containing vast volumes of unstructured and semi-structured content segments, such as knowledge base entries, policy documents, research reports, and user-generated content. Retrieving relevant information from these corpora presents technical challenges due to the lack of consistent structure, semantic variability, and limitations in conventional retrieval techniques.

Existing information retrieval systems commonly employ vector-based semantic search pipelines that transform content segments into high-dimensional embeddings and match them against a query vector using similarity metrics. While these approaches offer improvements over basic keyword matching, they often return results that are contextually adjacent but not structurally relevant, leading to high rates of false positives and misaligned retrieval outputs.

Conventional semantic search pipelines generally lack mechanisms to incorporate structured knowledge constraints or relational context during retrieval. These systems operate in a flat vector space and fail to distinguish between content segments that are topically similar versus those that are structurally validated through explicit or inferred relationships. As a result, retrieval performance degrades in domains where contextual precision, logical structure, or content provenance is critical.

Moreover, current systems typically apply a single-path retrieval process, executing either vector-based similarity search or symbolic filtering but not both in parallel. This architectural limitation reduces the system's ability to reconcile divergent representations of content relevance or to enforce alignment across multiple retrieval paths.

These limitations are further compounded by the absence of robust constraint resolution mechanisms. Existing systems do not dynamically cross-reference candidate retrievals with a structured relationship graph or adjust scoring based on cross-validation between parallel search strategies. Without such constraint-aware validation, search outputs may contain content segments that lack meaningful grounding within the structured domain context.

Accordingly, there remains a need for systems and methods that improve the accuracy of semantic retrieval by reducing false positives and enabling alignment between semantically relevant content and structured contextual relationships.

SUMMARY

Systems and methods in accordance with various embodiments of the present disclosure may overcome one or more of the aforementioned and other deficiencies experienced in conventional approaches to semantic retrieval and knowledge-based content search. In particular, various embodiments describe systems and methods for augmenting semantic search using dual-path indexing and constraint resolution logic that integrates vector-based similarity retrieval with structured relationship validation to improve contextual precision, reduce false positives, and support workflows requiring both semantic alignment and logical connection integrity.

Embodiments receive a plurality of content segments, each associated with at least one source document. These segments are processed through a dual-indexing pipeline that generates semantic vector embeddings and extracts structured inter-segment relationships. The resulting data is maintained in parallel index structures: a vector index that supports similarity-based retrieval and a graph-based structure that encodes relationships as traversable connections. This parallel structure enables the system to interpret both semantic meaning and contextual structure during subsequent retrieval operations.

Upon receiving a query, the system initiates two parallel retrieval paths. One path identifies content segments semantically similar to the query using the vector index, while the other path traverses the structured relationship graph to identify contextually connected segments. The two retrieval paths operate concurrently without requiring serial coordination or prior results from the other path. A constraint resolution process cross-references the segments retrieved from the vector index against those identified through graph traversal. Candidate segments are scored based on alignment across both paths, and a unified ranking is generated that prioritizes results supported by both semantic similarity and structured connectivity.

Structured relationships may include explicit references (e.g., one segment citing another), implicit semantic associations inferred through content analysis, hierarchical parent-child linkages, and cross-document references spanning heterogeneous sources. In certain embodiments, directional relationships and annotated edge types are used to inform traversal paths and refine filtering logic. These relationships allow the retrieval process to be constrained according to schema-aligned knowledge structures, improving downstream interpretability and alignment with domain-specific expectations.

Embodiments may include an incremental update mechanism that processes new content segments through the same dual-indexing pipeline, detects potential connections to previously indexed segments, updates the relationship graph with new connections, reindexes affected vector entries, and invalidates cached traversal paths impacted by the update. In certain implementations, the vector index and relationship graph may be distributed across multiple storage nodes, with partitioning strategies that co-locate related data, replication for fault tolerance, load balancing for query distribution, and consistency protocols to ensure synchronized updates and stable query performance.

The constraint resolution process may normalize relevance scores across the two retrieval paths, apply adaptive weighting based on query-specific attributes, and enforce diversity criteria in top-ranked results. Tie-breaking rules may be applied when content segments achieve equivalent composite scores across semantic and structural dimensions. In certain embodiments, user interaction signals—including result selection or rejection patterns—may be incorporated into the system's learning pipeline to refine edge weights within the relationship graph and dynamically adjust constraint resolution parameters over time.

Advantageously, the disclosed systems improve the technical field of semantic retrieval by replacing static keyword search and isolated vector-based methods with dual-path retrieval architectures that incorporate both semantic similarity and graph-validated relationships. The system supports context-aware query resolution that operates across multiple knowledge representations, thereby improving retrieval accuracy and reducing reliance on predefined matching rules.

Further, constraint-based validation using graph traversal logic reduces false positives by eliminating semantically similar but structurally irrelevant content segments. This dynamic filtering mechanism allows the system to enforce contextual integrity at query time without relying on static rule sets or hardcoded filters.

Further still, the system enables parallel indexing and retrieval pipelines that reduce query latency and decouple semantic and structural resolution paths. This architectural separation allows for independent optimization of vector-based similarity search and graph-based traversal logic while supporting coordinated resolution workflows at inference time.

Further yet, the feedback incorporation mechanism supports continuous learning by adjusting internal graph weights and constraint resolution heuristics in response to evolving user preferences and domain-specific retrieval patterns. These updates may be triggered by user interactions captured across multiple sessions or deployment contexts.

Additionally, the system architecture supports scalable deployment across distributed storage and compute infrastructure, enabling high-throughput indexing and query execution over large and heterogeneous content corpora. Fault tolerance mechanisms and synchronization protocols ensure consistency and availability even under partial system failure or concurrent update conditions.

As used herein, the term "dual-indexing pipeline" refers to a computational process that generates both vector embeddings and structured relationships from input content segments in parallel. The term "structured knowledge constraints" refers to logical or semantic conditions applied during retrieval that are derived from graph-encoded relationships. The term "constraint resolution" refers to the process of reconciling semantically similar segments with graph-validated connections to generate a final ranking that integrates both sources of evidence.

Although described in connection with information retrieval across document segments, the systems and methods disclosed herein may be applied to use cases such as research synthesis, knowledge discovery, educational resource aggregation, regulatory interpretation, or technical literature retrieval and synthesis, where semantic similarity alone is insufficient without structural validation.

Various other functions and embodiments are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 3 illustrates a retrieval and constraint resolution workflow using parallel retrieval paths and unified result ranking in accordance with various embodiments.

FIG. 4 illustrates an example process for semantic retrieval with structured knowledge constraints in accordance with various embodiments.

DETAILED DESCRIPTION

Figure 1:
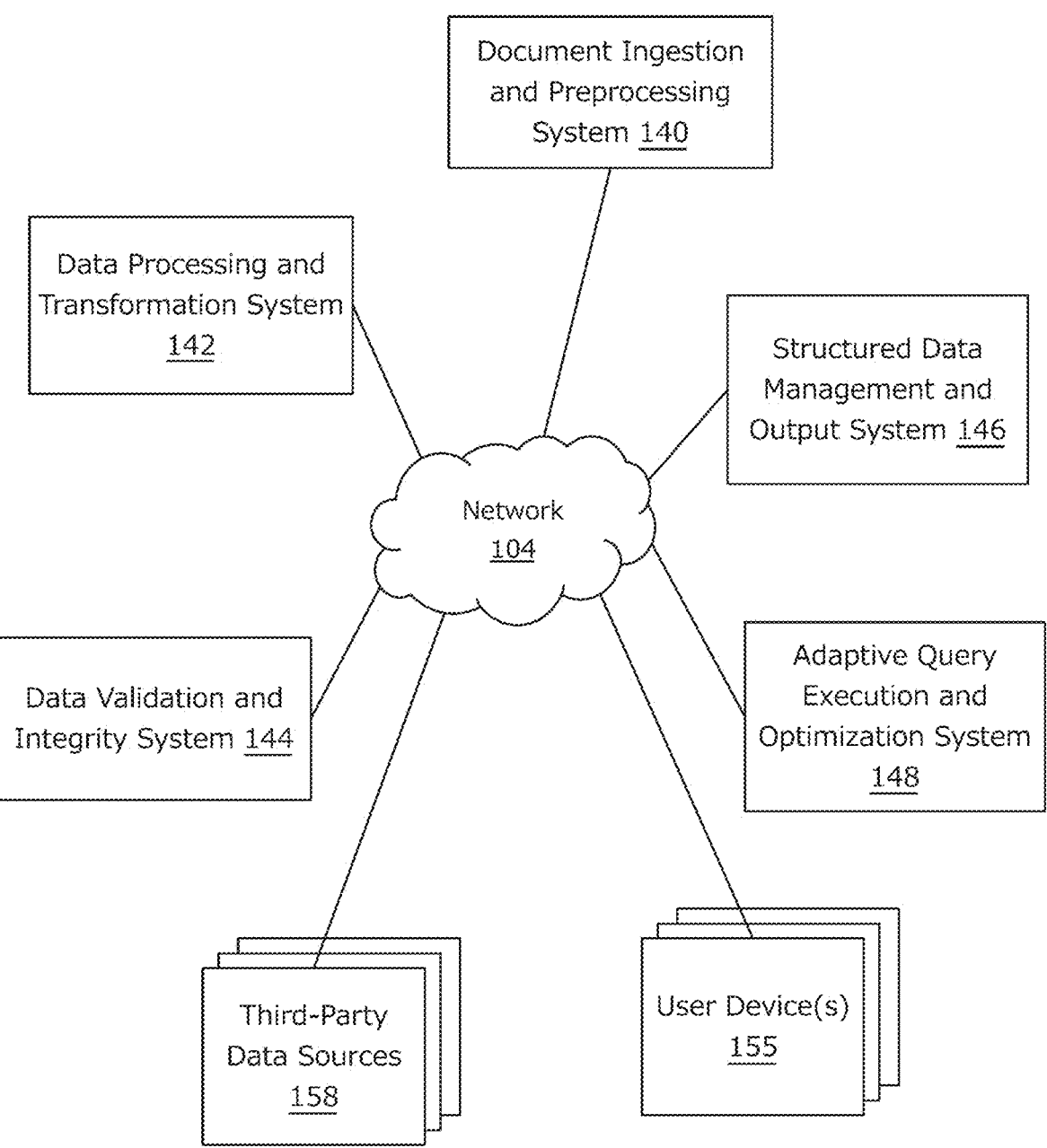
FIG. 1 illustrates a system architecture for semantic retrieval with structured knowledge constraints in accordance with various embodiments.

The embodiments described herein relate to systems and methods for augmenting semantic search with structured knowledge constraints. The system is operable to receive content segments from one or more source documents, generate vector-based representations and structured relationships, and perform semantic retrieval using dual-path indexing followed by constraint resolution logic. In various embodiments, the system includes components for parallel content indexing, structured relationship graph construction, semantic query processing, graph-based traversal, and ranking reconciliation—thereby enabling retrieval processes that incorporate both semantic similarity and logical connectivity. The system processes individual content segments through a dual-indexing pipeline, constructs and updates traversable relationship graphs, and performs coordinated retrieval and scoring operations based on alignment between vector similarity and graph connectivity. In certain embodiments, the system supports distributed storage, incremental updates, and feedback incorporation, resulting in a retrieval infrastructure designed to operate across large-scale, heterogeneous content corpora with semantic and structural alignment constraints applied during query execution.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1 illustrates an exemplary embodiment of a system architecture for augmenting semantic search with structured knowledge constraints, in accordance with various embodiments. As shown, the system includes document ingestion and preprocessing system 140, data processing and transformation system 142, data validation and integrity system 144, structured data management and output system 146, adaptive query execution and optimization system 148, user device(s) 155, third-party data sources 158, and a network 104 over which the various systems and devices communicate and interact.

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

User device(s) 155 include, generally, any computer or computing device having the capability to communicate over network 104, such that a user may interact with the systems described herein. Data may be collected from user device(s) 155, and retrieval requests may be initiated from each user device 155. By way of example, a user device 155 may be a server, a desktop computer, a laptop computer, a personal digital assistant (PDA), an in-vehicle or handheld navigation system, a smartphone or cellular phone, or a mobile computing device. Each user device 155 may execute one or more applications—such as a web browser or dedicated software—to submit search queries, view returned content segments, or refine results based on feedback mechanisms supported by the system over the network 104.

In particular embodiments, each user device 155 is an electronic device incorporating hardware, software, embedded logic components, or a combination thereof, to carry out the functions described or supported by user device 155. For instance, a user device 155 may be a desktop computer system, notebook computer system, netbook computer system, handheld electronic device, or a mobile telephone. The present disclosure contemplates any suitable form of user device 155. A user device 155 may enable a remote or local user to access network 104 and, in some implementations, interface with adaptive query execution and optimization system 148, structured data management and output system 146, or other modules discussed herein.

User device 155 may include a web browser (e.g., MICROSOFT EDGE, GOOGLE CHROME, MOZILLA FIREFOX) with or without various add-ons, plug-ins, or extensions (e.g., a toolbar). A user device 155 may enable a user to enter a Uniform Resource Locator (URL) or other address directing the web browser to a server, whereupon the user device 155 may generate a Hyper Text Transfer Protocol (HTTP) request for the server. The server can respond with one or more Hyper Text Markup Language (HTML) files, which the user device 155 may render for display to the user. The present disclosure contemplates the use of various suitable web technologies, including HTML, XHTML, XML, JAVASCRIPT, JAVA, AJAX, or other comparable technologies.

In some embodiments, user device 155 may host an application installed locally, allowing the user to submit semantic search queries, configure constraint parameters, or initiate updates to the dual-indexing pipeline. The application may receive data from network 104 and display results within a dedicated interface, allowing users to view ranked segments, refine queries, or contribute interaction data to downstream feedback incorporation mechanisms.

Any suitable number of user devices 155 may be employed, and they may take any appropriate physical form. Examples include but are not limited to an embedded computer system, a system-on-chip (SoC), a single-board computer (SBC), a desktop system, a laptop or notebook system, a mobile phone, a personal digital assistant (PDA), a server, or any combination thereof. In certain scenarios, user device(s) 155 may be geographically distributed, reside in a cloud environment, or operate in real time or batch mode. One or more steps or methods described herein may be performed partially or wholly by one or more user devices 155 at different times, or at different locations, depending on system requirements.

Network 104 generally represents one or more interconnected networks (such as the Internet, a corporate intranet, or a combination thereof) over which the various components shown in FIG. 1—such as user device(s) 155, third-party data sources 158, document ingestion and preprocessing system 140, data processing and transformation system 142, data validation and integrity system 144, structured data management and output system 146, and adaptive query execution and optimization system 148—communicate and interact. In particular embodiments, network 104 may be an intranet, an extranet, a virtual private network (VPN), a local area network (LAN), a wireless LAN (WLAN), a wide area network (WAN), a metropolitan area network (MAN), a portion of the Internet, or another network, or a combination of two or more such networks. One or more links couple the systems and data resources described herein to network 104, with each link including one or more wired, wireless, or optical connections. The present disclosure contemplates any suitable network 104 and any suitable link for connecting the various systems and components described herein.

In various embodiments, network 104 enables the flow of content segments, query instructions, structured index updates, and interaction signals between systems. For example, content segments from third-party data sources

158 may be transmitted to document ingestion and preprocessing system 140, while downstream outputs from structured data management and output system 146 may be retrieved by user device(s) 155. Additionally, network 104 may enable distributed operation of adaptive query execution and optimization system 148 and data processing and transformation system 142, supporting parallel indexing, graph traversal, and feedback-based learning workflows across nodes.

The systems described in FIG. 1 may communicate over network 104 using real-time or asynchronous protocols. In some implementations, inference-intensive operations—such as vector embedding generation or constraint resolution processes—may be delegated to remote processing nodes accessible over network 104, while relationship graph storage or user interaction logs are maintained locally. Various system configurations, including cloud-based, on-premises, and hybrid environments, may be used to optimize system scalability, resilience, and query responsiveness, depending on operational and architectural requirements.

Third-party data sources 158 are operable to provide external content segments, metadata, and document resources that are ingested and processed by the systems shown in FIG. 1. More specifically, third-party data sources 158 may include external databases, document repositories, APIs, or streaming endpoints that generate or maintain content relevant to downstream semantic retrieval and constraint-based validation. For example, third-party data sources 158 may transmit regulatory filings, knowledge base entries, research papers, technical documentation, legal records, or other structured or unstructured materials to document ingestion and preprocessing system 140 via network 104.

In certain embodiments, third-party data sources 158 include publisher endpoints or data-sharing services that expose structured or semi-structured document payloads through authenticated channels. These documents may arrive as batch uploads, live document feeds, or API responses, and may be accompanied by metadata fields such as publication date, source identifier, version history, or relevance tags. Document ingestion and preprocessing system 140 is operable to extract, normalize, and tokenize these inputs for dual-path indexing by data processing and transformation system 142.

Third-party data sources 158 may further support schema-aligned enrichment workflows, such as providing external relationship mappings, curated ontologies, or citation networks that enhance the structured graph maintained by the system. In such implementations, graph structure updates and vector re-indexing operations may be triggered based on the arrival of new third-party content that alters existing segment relationships. In some embodiments, access to third-party data sources 158 may be regulated by access policies, subscription models, or compliance rules to control availability, frequency, or depth of integration.

Additionally, third-party data sources 158 may include both public and private systems, ranging from government-maintained datasets to proprietary vendor APIs. In distributed deployments, content from third-party data sources 158 may be routed through edge processing nodes or staging layers before being delivered to the core ingestion pipeline. The system is operable to validate formatting consistency, extract document structure, and propagate content tags or classification hints through the indexing pipeline as part of a coordinated ingestion and enrichment process.

Document ingestion and preprocessing system 140 is operable to receive unstructured and semi-structured content from third-party data sources 158 and user device(s) 155 via network 104. More specifically, document ingestion and preprocessing system 140 is configured to accept content segments originating from diverse sources, such as uploaded files (e.g., PDFs, DOCX, HTML, TXT), API-based responses from external document providers, or scheduled directory crawls that detect newly available materials. The ingestion process may include checksum validation, MIME type verification, and document fingerprinting to ensure input integrity and de-duplication prior to further process- ing.

For example, in one implementation, document ingestion and preprocessing system 140 may parse multipart MIME boundaries in an API response containing several document attachments, extract the individual payloads, and assign each a unique document identifier. In another implementation, when a user uploads a ZIP archive from user device 155 containing multiple year-end reports, document ingestion and preprocessing system 140 may iterate through the archive entries, apply filename heuristics, and segment each entry for downstream indexing.

Document ingestion and preprocessing system 140 is operable to partition incoming documents into a plurality of content segments. Each content segment represents a distinct portion of at least one source document. Segmentation may be performed using structural parsing techniques (e.g., analysis of document object models or PDF object hierar- chies), natural language-based boundary detection (e.g., paragraph breaks, list indicators, or numbered section head- ings), or tag-based markup interpretation (e.g., XML or JSON schema delimiters). Document ingestion and prepro- cessing system 140 may associate metadata with each con- tent segment, including segment position, source document identifier, page number, document format lineage, and optionally a provisional document class label. This seg- mented representation is passed downstream for processing and indexing.

In certain embodiments, document ingestion and prepro- cessing system 140 applies normalization routines to convert non-standard encodings or legacy formats into a uniform representation suitable for downstream processing. For instance, character sets may be normalized to UTF-8, pro- prietary symbols may be mapped to Unicode equivalents, and malformed HTML or PDF structures may be repaired using error-tolerant parsers. The output of document inges- tion and preprocessing system 140 comprises a set of content segments, each associated with structured metadata and formatted in a normalized representation.

Document ingestion and preprocessing system 140 may maintain internal processing queues to stage content for vector embedding, graph construction, and dual-path index- ing by data processing and transformation system 142. More specifically, each queue may incorporate timestamp-based priority rules, batching identifiers, and checkpoint metadata to coordinate segment delivery. These queues may track segment lineage and pipeline position, allowing fault-han- dling mechanisms to isolate failed segments or re-queue delayed items. Queue management logic ensures consistent throughput into the processing pipeline and prevents queue saturation during high-volume ingestion cycles.

In certain embodiments, ingestion workflows are config- urable through policy-driven triggers, allowing ingestion to operate on a scheduled, on-demand, or event-based basis. For example, ingestion may be triggered upon detection of new files in a monitored cloud folder, receipt of a webhook from a data provider, or manual upload via a user interface on user device 155.

In various implementations, document ingestion and pre- processing system 140 may interact with auxiliary services such as OCR engines, image preprocessors, or language detectors to supplement content preparation. These services may be invoked conditionally, for example, if an uploaded document contains rasterized pages, non-English language markers, or malformed layout streams requiring visual reconstruction.

Content segments produced by document ingestion and preprocessing system 140 are then passed to data processing and transformation system 142, where dual-indexing, embedding generation, and relationship extraction are per- formed. Each content segment serves as a discrete unit of analysis, and the metadata maintained during ingestion is used to track lineage, guide constraint resolution, and sup- port parallel path retrieval.

Data processing and transformation system 142 is oper- able to generate semantic vector embeddings and extract structured relationships from content segments prepared by document ingestion and preprocessing system 140. More specifically, data processing and transformation system 142 performs a dual-indexing operation comprising a vectoriza- tion process and a relationship extraction process. As will be described further in connection with FIG. 2, data processing and transformation system 142 includes internal modules for embedding generation, structured graph construction, and synchronization of parallel index structures.

In various embodiments, data processing and transforma- tion system 142 applies one or more machine learning models, embedding generators, or appropriate encoding techniques to generate a vector representation for each received content segment. The generated vector embedding may represent semantic features of the segment and may optionally incorporate contextual metadata, schema-aligned tags, or blueprint-specific input modifications. Each vector embedding is written to a vector index structure for subse- quent retrieval operations.

Concurrently, data processing and transformation system 142 is operable to extract structured relationships between content segments. These relationships may include docu- ment-defined references, inter-segment citations, hierarchi- cal connections, temporal linkages, or other logical associa- tions. Structured relationships may be identified using rule- based parsing, entity linking logic, co-occurrence analysis, pattern-based recognition, or inference techniques. Each relationship is encoded as an edge in a graph structure, where nodes represent individual content segments and edges represent discovered or inferred relationships.

Data processing and transformation system 142 maintains both the vector index and the graph structure as parallel data structures. The vector index supports similarity-based lookup of segment embeddings, while the graph structure supports traversable connections used during structure-con- strained query execution. Each content segment is indexed across both structures, with consistent segment identifiers and lineage metadata maintained across indexing processes.

In certain embodiments, the graph structure includes directional edges, edge-type labels, and confidence scores. For example, an edge may denote a dependency relationship between segments, a cross-reference between figures or sections, or a logical progression within a document hier- archy. Each relationship may be enriched with metadata identifying its source, detection method, and traversal behavior.

Data processing and transformation system 142 may maintain processing queues and dependency tracking struc- tures to coordinate embedding generation, graph updates, and data structure writes. In an embodiment, new content segments are processed in batches or streams. As new segments are added, the system evaluates potential relationships to previously indexed content, integrates those relationships into the graph structure, and updates vector entries when required. Previously cached paths or similarity scores may be invalidated or updated.

In certain embodiments, data processing and transformation system 142 supports distributed storage of the vector index and graph structure. The vector index may be partitioned using segment-based sharding, lexical stratification, or embedding-range hashing, and the graph structure may be distributed across a node-aligned or relationship-type-aligned topology. Replication and synchronization protocols may be employed to ensure consistency across storage partitions. Load-balancing logic may distribute retrieval operations based on indexing density or query frequency.

Each embedding and relationship may be tagged with metadata indicating the segment's origin, processing configuration, embedding model version, or indexing timestamp. In some embodiments, audit trails or reprocessing triggers are maintained to support recovery, rollback, or model refresh operations. For example, if a change in the embedding generator or relationship detection configuration is detected, the system may automatically reprocess the affected content segments.

The data output by data processing and transformation system 142 is stored in parallel form and transmitted to adaptive query execution and optimization system 148 for retrieval processing. The structure and organization of these parallel data outputs enable subsequent constraint resolution workflows and dual-path retrieval operations described further below.

Data validation and integrity system 144 is operable to evaluate the consistency, coherence, and logical alignment of results produced by dual-path retrieval workflows. More specifically, data validation and integrity system 144 performs cross-referencing operations between content segments retrieved from vector-based and graph-based retrieval paths, identifies discrepancies, and applies relevance adjustments based on graph-supported relationships. These operations implement constraint resolution logic to refine segment scoring and ranking based on the presence or absence of structured knowledge connections across the parallel retrieval outputs.

Data validation and integrity system 144 may normalize relevance scores by applying alignment weights derived from graph topology, segment co-occurrence frequency, or traversal depth. For example, when a segment is retrieved through semantic similarity but lacks support in the graph structure, data validation and integrity system 144 may apply a penalty to its composite score. Conversely, segments validated by graph traversal may receive a boost in final ranking. In certain embodiments, score normalization routines incorporate configuration parameters based on query type, graph edge type, or historical feedback from prior query results.

In some implementations, data validation and integrity system 144 may also incorporate resolution policies that apply tie-breaking logic, diversity constraints, or segment deduplication strategies. For example, when multiple candidate segments share equivalent relevance scores, the system may prioritize segments with higher graph centrality, greater structural specificity, or more recent ingestion timestamps. These policies enable consistent and deterministic output behavior under ambiguity conditions.

Data validation and integrity system 144 may maintain a constraint resolution module configured to filter semantically retrieved results based on graph-enforced constraints. This module operates by identifying intersecting segment identifiers across retrieval paths, computing composite validation scores, and generating a unified ranking of segments prioritized by both semantic and structural alignment. In certain embodiments, relevance scores and final rankings are stored with associated metadata for downstream inspection, auditability, or training data collection.

In some configurations, data validation and integrity system 144 may integrate with logging or telemetry components to track constraint resolution decisions, including rejected segments, scoring deltas, and graph traversal characteristics. This information may be used to tune the weighting model, validate system correctness, or refine future retrieval workflows based on system performance or user interactions.

The operations performed by data validation and integrity system 144 support constraint-based filtering of semantically similar segments and enable the system to prioritize content that satisfies structured knowledge relationships in addition to vector proximity. This layered validation process contributes to more accurate, domain-consistent retrieval outcomes while reducing the incidence of false positives in top-ranked results.

Structured data management and output system 146 is operable to format, store, and deliver validated content segments and associated metadata resulting from the constraint resolution process. More specifically, structured data management and output system 146 receives content segments ranked and scored by data validation and integrity system 144, serializes those segments into structured representations, and provides programmatic access to the output for integration into downstream applications or user-facing interfaces.

Structured data management and output system 146 may generate structured outputs using a schema-conformant transformation process. This process may map validated content segments into a machine-readable format such as JSON, XML, or tabular representations, aligning extracted content with schema fields defined by domain-specific or system-defined ontologies. Field-level metadata—including source document identifiers, retrieval path lineage, relationship graph context, and constraint resolution metrics—may be attached to each structured record for transparency and traceability.

In certain embodiments, structured data management and output system 146 may include an output formatting engine that supports configurable serialization pipelines. For example, system administrators may define field output rules, namespace conventions, or destination-specific packaging formats. The formatting engine applies these configurations at runtime, enabling compatibility with downstream systems such as knowledge graphs, document viewers, search interfaces, or external databases.

Structured data management and output system 146 may maintain an output datastore configured to store finalized structured results alongside intermediate scoring data, segment identifiers, and retrieval provenance. In some embodiments, this datastore may support versioning, time-based partitioning, and access control policies to support auditability and historical comparison of retrieval results.

Structured data management and output system 146 may further provide interfaces for external systems to retrieve results via API calls, message queues, or export routines. These interfaces may include query parameters for filtering, sorting, or paginating structured content. In certain implementations, structured data management and output system 146 may generate batch exports or incremental updates based on configured schedules or retrieval triggers, supporting both real-time delivery and asynchronous reporting workflows.

Structured data management and output system 146 supports output consistency and schema alignment by enforcing structural constraints during serialization and flagging outputs that fail schema conformance checks. In certain configurations, fallback logic may be used to annotate incomplete records, defer invalidated segments, or queue follow-up validation steps for downstream reconciliation or human review.

In supporting delivery of constraint-resolved, semantically and structurally aligned segments, structured data management and output system 146 enables stable integration of retrieved content into broader knowledge infrastructures. Its operations are coupled to the retrieval and validation processes described above and complete the full retrieval lifecycle by materializing content for consumption by user device(s) 155, storage systems, or third-party applications.

Data validation and integrity system 144 is operable to evaluate content segment coherence, detect graph structural inconsistencies, verify alignment between parallel retrieval paths, and maintain metadata consistency across updates to vector and graph representations. More specifically, data validation and integrity system 144 performs automated checks and corrective operations to ensure that the extracted content, indexed representations, and relationship structures adhere to internal consistency rules and schema-aligned constraints throughout the system lifecycle.

For example, data validation and integrity system 144 may perform duplicate detection across content segments by comparing normalized embeddings, canonicalized text strings, and source lineage metadata. Detected duplications may be flagged for de-duplication, suppressed from ranking workflows, or retained with adjusted weights based on version identifiers or publication timestamps. In certain implementations, content segment lineage metadata—such as segment position, original source ID, ingestion timestamp, and transformation history—is logged and cross-verified to support reproducible recall and traceability.

In some embodiments, data validation and integrity system 144 is operable to detect logical disconnects in the graph structure by evaluating edge connectivity density, directional integrity, and circular path violations. For instance, if a new content segment introduces an edge inconsistent with schema-defined graph traversal rules or semantic type hierarchies, the system may quarantine the segment for reprocessing or apply rule-based correction to reclassify the edge type. Graph diagnostics may include reachability tests between core anchor nodes, validation of temporal ordering (e.g., publication dependencies), or cross-source agreement checks for multi-source content sets.

Data validation and integrity system 144 may also assess alignment between vector-based semantic similarity retrieval and graph-based structured traversal. This includes validating that high-similarity content segments are not structurally disqualified under graph constraints, and conversely, that highly connected nodes are semantically relevant to the original query intent. In certain embodiments, validation scoring may be performed during constraint resolution execution, with misaligned results flagged for down-ranking, manual review, or feedback-based graph refinement.

In accordance with parallel update workflows, data validation and integrity system 144 may monitor and reconcile changes made to one data structure (e.g., a new edge in the graph) against the corresponding state of the other (e.g., stale embedding vectors). Hashing functions, document fingerprinting, and version-controlled update logs may be used to detect divergence between data structures and to trigger corrective processes such as selective reindexing, deferred update scheduling, or conflict resolution.

In certain configurations, data validation and integrity system 144 may interface with structured data management and output system 146 to tag content segments with quality scores, structural anomaly flags, or inferred validation states. These annotations may inform downstream decision-making regarding which content to expose, prioritize, suppress, or defer within the overall retrieval and ranking pipeline. Moreover, validation metadata may be made available to users or consuming systems for auditability, explainability, or trace validation.

Data validation and integrity system 144 may also enforce system-level constraints on resource utilization and performance degradation. For example, the system may limit graph traversal depth for queries exceeding a configured threshold, prevent over-indexing of redundant segments, or dynamically delay validation-heavy processes during periods of degraded system health. In distributed deployments, validation tasks may be shared across compute nodes or scheduled asynchronously to minimize impact on retrieval latency.

Adaptive query execution and optimization system 148 is operable to coordinate retrieval workflows, apply constraint resolution logic, and dynamically adjust retrieval parameters based on performance feedback. More specifically, adaptive query execution and optimization system 148 manages the execution of vector-based and graph-based retrieval paths in parallel, applies scoring adjustments based on their alignment, and updates internal resolution heuristics based on prior interaction signals or retrieval outcomes. As will be described further in FIG. 3, adaptive query execution and optimization system 148 enables context-aware interpretation of retrieval queries through dual-path execution and supports adaptive refinement based on structured metadata, relevance ranking, and system-level performance telemetry.

In operation, adaptive query execution and optimization system 148 receives a structured or unstructured query, initiates semantic vector retrieval from the vector index, and concurrently performs a graph traversal from the structured relationship graph. These retrieval processes are coordinated using decoupled execution threads or asynchronous function calls, such that results can be gathered independently and compared in a constraint resolution step. The constraint resolution process applies scoring logic that adjusts or filters the set of semantically similar content segments based on their presence, absence, or degree of connectivity within the relationship graph. Adjusted scores may reflect traversal depth, edge types, segment co-occurrence, or prior query-result confirmation signals.

Adaptive query execution and optimization system 148 may maintain resolution policies that govern how to merge, filter, or prioritize results from the dual paths. For example, a filtering policy may exclude content segments that lack a minimum confidence score from graph traversal or apply diversity rules to avoid overrepresentation of similar results. In certain embodiments, policies may be stored as parameterized functions, allowing reweighting of scoring features in real time. These parameters may be adjusted using historical usage signals, retrieval latency metrics, or user-labeled preferences. In some implementations, fallback resolution routines are triggered when either path yields insufficient results, including partial graph matching, semantic fallback expansion, or hybrid interpolation strategies that infer context through proxy relationships.

Additionally, adaptive query execution and optimization system 148 is operable to log system performance metrics, such as query processing time, resolution agreement rate, top-k precision, or user interaction patterns. These metrics may be used to inform future optimization cycles. For example, a repeated query with low graph alignment may prompt the system to reevaluate edge types or relationship weights between specific content segments. In another example, a consistent pattern of user overrides on a certain class of retrieval results may trigger feedback integration to modify scoring logic or influence segment weighting during ranking.

In certain embodiments, adaptive query execution and optimization system 148 includes a query interpretation module operable to apply semantic parsing techniques to decompose multi-intent queries, infer structural requirements implied by the query, and precondition the retrieval process accordingly. The query interpretation module may tokenize query components into sub-intents, associate each sub-intent with a content segment type, and generate execution directives for both the vector and graph paths. For instance, a query seeking "regulatory references related to export controls" may trigger vector embedding matching on export control terminology and parallel graph traversal rooted at regulatory reference nodes.

The architecture of adaptive query execution and optimization system 148 supports modular integration with system-level services such as logging engines, performance dashboards, caching layers, and user interface frameworks. In distributed configurations, query execution components may reside across multiple nodes, with retrieval execution scheduled using load-balancing heuristics or cost-aware dispatch queues. Optimization logic can be deployed in containerized environments with independent scaling of vector retrieval and graph processing tasks, enabling efficient and resilient query resolution across large and heterogeneous content corpora.

Figure 2:
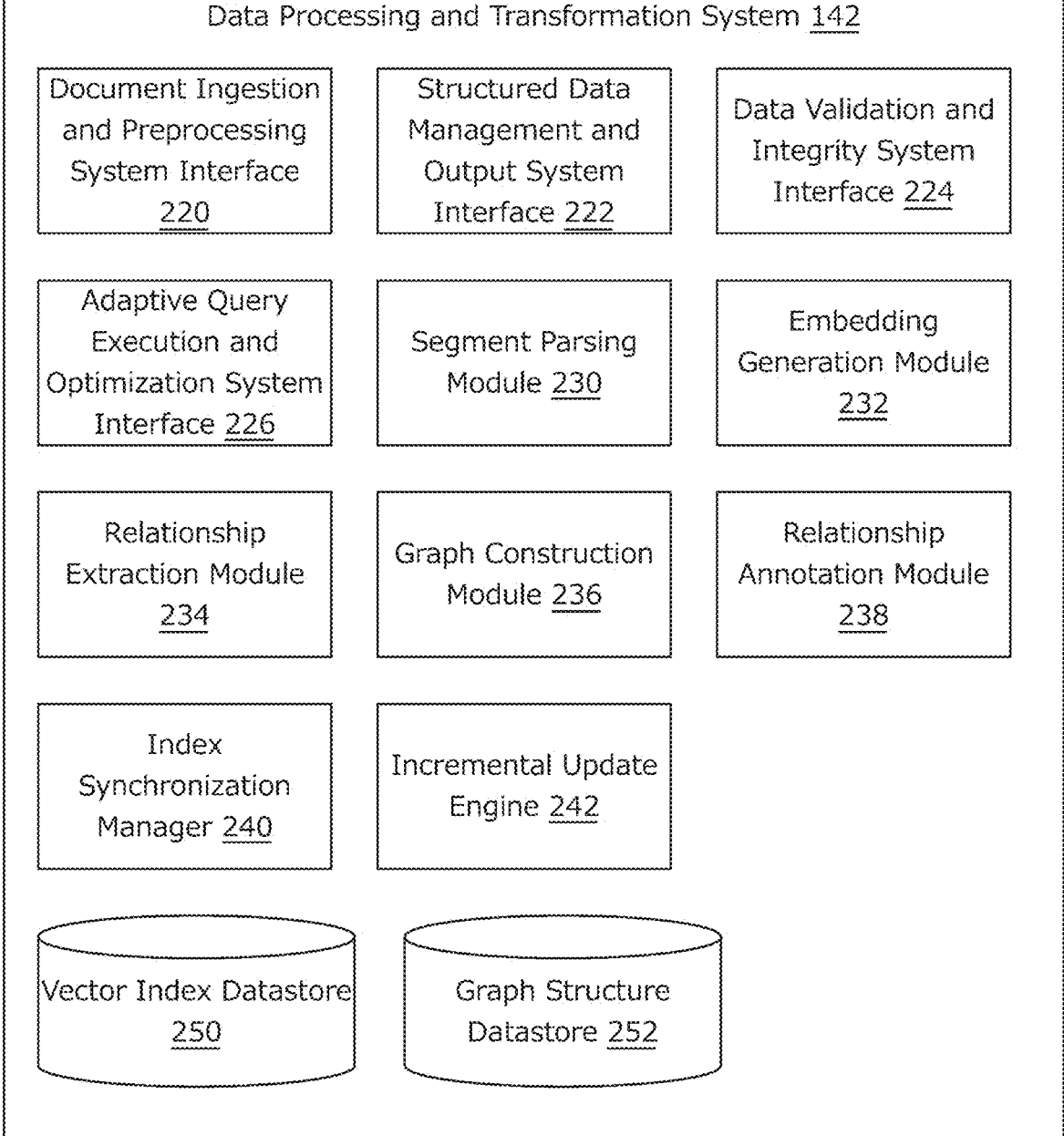
FIG. 2 illustrates components of a dual-indexing pipeline for vector embedding generation and structured relationship extraction in accordance with various embodiments.

FIG. 2 illustrates an exemplary embodiment of the internal components of data processing and transformation system 142, in accordance with various embodiments. As shown, data processing and transformation system 142 includes document ingestion and preprocessing system interface 220, structured data management and output system interface 222, data validation and integrity system interface 224, adaptive query execution and optimization system interface 226, segment parsing module 230, embedding generation module 232, relationship extraction module 234, graph construction module 236, relationship annotation module 238, index synchronization manager 240, incremental update engine 242, vector index datastore 250, and graph structure datastore 252.

Document ingestion and preprocessing system interface 220 is operable to receive content segments and associated metadata from document ingestion and preprocessing system 140 for further processing by data processing and transformation system 142. More specifically, document ingestion and preprocessing system interface 220 receives a plurality of content segments, each derived from a source document, and transfers the content segments into a normalized internal format suitable for semantic and structural processing.

For example, document ingestion and preprocessing system interface 220 may receive content segments that include extracted textual data, positional indicators, segment-level metadata (e.g., document class, page number, segment index), and format lineage descriptors (e.g., PDF origin, OCR layer, markup structure). Interface 220 is operable to validate the completeness of incoming segment packages and perform light preprocessing such as whitespace normalization, encoding checks, and character substitution correction before routing the segments into segment parsing module 230.

In certain embodiments, document ingestion and preprocessing system interface 220 is further operable to coordinate batch-level tracking using segment group identifiers, ingestion timestamps, and routing metadata to ensure consistent propagation of processing context throughout the dual-path indexing pipeline. This coordination enables parallelization across segments belonging to different documents while preserving intra-document structure for graph construction.

In some implementations, document ingestion and preprocessing system interface 220 may include a message queue consumer or event-driven ingestion process (e.g., via Apache Kafka, RabbitMQ, or other pub-sub frameworks) configured to subscribe to preprocessing output topics and trigger downstream execution in data processing and transformation system 142. These implementations may include retry logic, backpressure controls, or checkpointing mechanisms to manage load conditions and ensure reliable delivery.

Document ingestion and preprocessing system interface 220 supports bidirectional communication for ingestion health reporting, error propagation, and backchannel control signals. For instance, failed or malformed segments may be routed back to document ingestion and preprocessing system 140 with standardized error codes or remediation hints. In certain embodiments, preprocessing success/failure metrics and latency telemetry may be logged by interface 220 for use by adaptive query execution and optimization system 148 or validation components.

Structured data management and output system interface 222 is operable to coordinate the transmission of transformed segment data, vector representations, and structured graph metadata from data processing and transformation system 142 to structured data management and output system 146. More specifically, structured data management and output system interface 222 enables the export of processed artifacts—including segment-level vector embeddings and graph-encoded relationships—for indexing, storage, and external retrieval.

In operation, structured data management and output system interface 222 receives output from components such as embedding generation module 232 and graph construction module 236 and formats the data according to expected schemas defined by structured data management and output system 146. These output formats may include nested JSON documents, vector arrays (e.g., in NumPy or HDF5-compatible encodings), or serialized graph elements compatible with Neo4j, Dgraph, or other graph-based systems.

In certain embodiments, interface 222 is operable to tag each outbound data object with persistence metadata, such as index shard identifiers, destination route keys, or snapshot generation markers. These tags facilitate storage partitioning, rollback operations, or targeted refreshes in structured data management and output system 146.

Structured data management and output system interface 222 may also perform interface-level normalization routines, such as coordinate reindexing or schema key transformation, to ensure conformity between internal processing representations and storage-layer schemas. In some implementations, the interface supports schema versioning, allowing downstream systems to consume outputs generated under evolving output specifications.

In particular embodiments, structured data management and output system interface 222 includes acknowledgement protocols, transport encryption (e.g., TLS), and retry policies to ensure that output data is reliably transmitted and persisted. Where applicable, output transmission may be decoupled via message queues or bulk write operations, depending on the system's deployment topology and throughput requirements.

Data validation and integrity system interface 224 is operable to coordinate validation-related signals, metadata annotations, and cross-component integrity checks between data processing and transformation system 142 and data validation and integrity system 144. More specifically, data validation and integrity system interface 224 enables communication of validation triggers, segment-level consistency metadata, and structural anomaly flags generated during processing.

In operation, data validation and integrity system interface 224 transmits candidate segments, intermediate graph structures, and vector alignment metadata for validation. This may include semantic outlier detection markers, relationship path discontinuities, or constraint violations flagged by relationship extraction module 234 or graph construction module 236. For example, if a newly extracted relationship introduces a cyclic dependency into a previously acyclic knowledge graph, interface 224 can initiate an integrity review request with reference to the affected nodes and edge types.

Interface 224 may also propagate contextual metadata associated with segment lineage, timestamp versions, and processing batch identifiers to ensure that the integrity system evaluates each structure with full awareness of its generation context. In certain embodiments, the interface is operable to normalize field representations and structure validation requests as schema-conformant payloads, including encoded relationship graphs and associated vector references.

In some implementations, data validation and integrity system interface 224 supports bidirectional communication, enabling feedback from data validation and integrity system 144 to inform retry operations, segment reprocessing, or graph pruning procedures within data processing and transformation system 142. For instance, flagged inconsistencies in vector alignment or metadata sparsity may trigger partial rollback and localized recomputation within modules such as index synchronization manager 240 or incremental update engine 242.

In particular embodiments, data validation and integrity system interface 224 employs secure transport protocols and checkpointing semantics to ensure atomic validation exchange events. Where applicable, validation signals may be logged or stored in dedicated audit queues for asynchronous evaluation and traceability.

Adaptive query execution and optimization system interface 226 is operable to facilitate inter-component communication between data processing and transformation system 142 and adaptive query execution and optimization system 148. More specifically, adaptive query execution and optimization system interface 226 manages the exchange of inference configuration parameters, retrieval optimization directives, and query context metadata required for coordinated retrieval and resolution across the dual-indexing architecture.

Adaptive query execution and optimization system interface 226 is operable to transmit vector and graph indexing metadata, including document class labels, segment weightings, and recent update lineage, to inform prompt construction or query strategy selection. For example, when adaptive query execution and optimization system 148 initiates a retrieval session, the interface may provide schema-aligned traversal constraints derived from the relationship graph or embedding similarity thresholds adapted to the target document set.

In various embodiments, interface 226 supports the export of indexing metrics such as embedding distribution statistics, graph connectivity metadata, and retrieval success rates. These metrics are used by adaptive query execution and optimization system 148 to refine execution logic, such as determining whether to initiate graph-based constraint validation or apply query-time edge filtering.

Interface 226 may further support the import of updated resolution parameters or prompt modifiers that affect how data processing and transformation system 142 prepares segment representations or resolves candidate ambiguity. For example, following a retrieval session that surfaces overlapping or underspecified results, adaptive query execution and optimization system 148 may issue updated scoring weights or modified traversal heuristics. Interface 226 translates and applies these adjustments to relevant modules, including relationship annotation module 238 and index synchronization manager 240.

In some implementations, adaptive query execution and optimization system interface 226 includes streaming protocols or priority queuing mechanisms to ensure low-latency handling of real-time query refinement requests, particularly when retrieval occurs on high-frequency or dynamically evolving content sets.

Segment parsing module 230 is operable to receive content segments via document ingestion and preprocessing system interface 220 and to perform parsing operations that identify and classify structural, textual, and positional attributes within each segment. More specifically, segment parsing module 230 evaluates content segments to detect discrete textual units, parse internal boundaries, and extract metadata properties such as logical headings, numerical identifiers, or formatting cues.

Segment parsing module 230 applies rule-based and machine-learning techniques to tokenize content into clause-level or field-level components, associating each token with source context such as page number, document class, or segmentation lineage. In certain embodiments, the parsing logic is schema-aware, referencing blueprint-specific constraints or domain-specific rulesets to guide structural segmentation. For instance, parsing a financial regulatory filing may trigger conditional logic to identify risk disclosures or recurring footnote patterns across segments.

In various implementations, segment parsing module 230 further determines whether each segment contains tabular content, inline references to other segments, or multi-lingual artifacts. When such attributes are detected, the module tags the segment accordingly, setting internal flags used later during embedding generation or relationship extraction. For example, detection of tabular structures may invoke alternative vectorization routines that preserve row-column alignment during embedding generation by embedding generation module 232.

Segment parsing module 230 may store intermediate parsing results in memory buffers or structured logs, which are referenced by subsequent modules during feature construction and annotation. Additionally, the module may issue metadata validation checks to ensure conformity with expected segment structures, such as verifying that all segments include a document ID, type classification, and minimum character count. Detected anomalies—such as null segments, overly long sections, or structurally inconsistent entries—may be flagged for review or correction by index synchronization manager 240.

In certain embodiments, segment parsing module 230 supports dynamic re-parsing in response to indexing feedback or relationship resolution failures. For instance, if graph construction module 236 fails to establish valid links due to malformed segment boundaries, a re-parsing operation may be triggered using updated inference parameters or alternate segmentation strategies. This enables iterative refinement of the parsed segment structure without requiring full re-ingestion of the document.

Segment parsing module 230, through its parsing logic and metadata tagging processes, ensures that each segment entering the dual-indexing pipeline is consistently formatted, structurally annotated, and semantically delineated-supporting alignment with both embedding generation and relationship graph modeling.

Embedding generation module 232 is operable to generate vector-based representations for parsed content segments, enabling similarity-based retrieval during query resolution. More specifically, embedding generation module 232 applies one or more language models to compute dense vector embeddings that capture semantic and contextual features of each segment.

In certain embodiments, embedding generation module 232 utilizes transformer-based models trained on domain-specific corpora to encode each content segment into an n-dimensional vector. The model selection may be conditioned on document class, segment length, or source system metadata. For example, segments originating from financial disclosures may invoke an embedding model fine-tuned on regulatory language, whereas instructional materials may use a general-purpose encoder with extended vocabulary support.

The embedding generation process may include pre-embedding normalization steps such as tokenization, lowercasing, stopword filtering, and model-specific truncation. Embedding generation module 232 supports configurable maximum token lengths and maintains internal logging of model invocations, confidence scores, and truncation thresholds for later audit or debugging.

In certain implementations, embedding generation module 232 supports both static embedding generation and prompt-augmented inference. For example, segments may be embedded using zero-shot or few-shot classification techniques, with optional inclusion of structured inference instructions or blueprint-specific prompts. The embedding process may incorporate metadata-aware encoding, whereby additional contextual information—such as document type or historical interaction patterns—is appended as auxiliary input to improve vector expressiveness.

Each vector embedding is stored in vector index datastore 250 and indexed according to a unique segment identifier. Embedding generation module 232 may also compute auxiliary embeddings for sub-components of a segment (e.g., headings, subclauses) to support fine-grained similarity resolution. These auxiliary vectors may be linked to the parent segment for co-retrieval and score aggregation.

In certain embodiments, embedding generation module 232 performs embedding quality validation using heuristics or embedding similarity distributions across known segment classes. Outlier vectors or low-confidence encodings may be flagged for reprocessing, and internal quality metrics (e.g., cosine variance, vector density, neighborhood stability) may be persisted for ongoing performance evaluation.

Embedding generation module 232 enables content segments to be expressed in a vectorized form suitable for efficient semantic similarity search, supporting the dual-path retrieval operations described in relation to FIG. 1 and further detailed in FIG. 3.

Relationship extraction module 234 is operable to identify structured relationships between content segments, forming the basis for graph-based traversal and constraint validation during query execution. More specifically, relationship extraction module 234 analyzes segment-level content and associated metadata to determine inter-segment associations based on semantic, positional, structural, or referential indicators.

In various embodiments, relationship extraction module 234 applies rule-based parsing, machine learning models, or hybrid techniques to extract relationship candidates. Rule-based parsing may include identifying explicit cross-references using regular expressions, such as citations (e.g., "see Section 3.2"), enumerated linkage (e.g., "the following sections"), or footnote markers. Machine learning approaches may include named entity co-occurrence modeling, coreference resolution, or sentence-level relation classifiers trained to detect context-dependent dependencies (e.g., precedence, causation, elaboration).

Relationship extraction module 234 may access segment metadata to derive implicit connections. For example, temporal alignment between segments with matching entity references across reporting periods may indicate longitudinal continuity. Alternatively, the presence of shared entity identifiers, tags, or user annotations may be used to infer one-to-one or many-to-one relationships between segments spanning different documents.

In certain embodiments, relationship extraction module 234 supports configurable relationship types and directionality. Relationships may be tagged with edge types such as "references," "cites," "expands," or "conflicts," and directional flags may be assigned based on syntactic analysis or domain heuristics. These annotated relationships are subsequently passed to graph construction module 236 for inclusion in a structured, traversable format.

Relationship extraction module 234 may apply confidence thresholds or validation rules to filter noisy or redundant connections. In an embodiment, the module evaluates proximity scores, language model attention weights, or graph-based consistency checks to validate candidate relationships before inclusion. Extracted relationships may include both intra-document (e.g., within a single source) and inter-document (e.g., across document sets) associations, supporting broader contextual reasoning.

In some implementations, relationship extraction module 234 incorporates historical extraction results to improve consistency across ingestions. For instance, prior validated relationships may serve as training data or may be carried forward into newly ingested content where similar patterns recur. Feedback signals from downstream modules—such as validation flags or user-corrected graph traversals—may be used to refine extraction parameters or retrain models.

The output of relationship extraction module 234 is a set of annotated edge tuples, each comprising a source segment ID, target segment ID, relationship type, directionality, and associated confidence score. These tuples are stored temporarily for processing by graph construction module 236.

Graph construction module 236 is operable to generate and maintain a structured graph representation of inter-segment relationships identified by relationship extraction module 234. More specifically, graph construction module 236 builds a directed graph wherein each node represents a content segment and each edge encodes a validated relationship between segments, including associated metadata and directional constraints.

In various embodiments, graph construction module 236 receives a stream of edge tuples comprising source and target segment identifiers, relationship types, directional indicators, and confidence scores. The module assigns a unique graph node to each content segment, if not already present, and inserts edges according to the extracted relationship metadata. Node attributes may include segment ID, document lineage, page number, document class, and temporal ordering. Edge attributes may include relationship type, directional weight, source of origin (e.g., rule-based vs. model-derived), and user feedback annotations if available.

Graph construction module 236 is operable to enforce relationship integrity constraints during graph creation. For example, bidirectional relationships may be instantiated when symmetric edge types are detected. In some embodiments, transitive closure rules may be applied to infer additional indirect relationships, such as chaining "cites" edges to identify extended reference paths. Cyclical edge detection may be used to flag anomalous loops that violate expected document logic or schema structure.

In certain implementations, graph construction module 236 segments the global graph into logical subgraphs or clusters based on document origin, segment topic, or schema-defined domains. These subgraphs may be separately stored and traversed to enable partitioned inference and localized validation. The module may also apply compression techniques or hashing mechanisms to maintain graph compactness while preserving traversal fidelity.

Graph construction module 236 stores the generated graph structure in graph structure datastore 252. The module ensures versioning support for each graph instance and enables rollback or diff-checking against previous versions to detect changes introduced by new content ingestion. Graph construction module 236 is further operable to interface with relationship annotation module 238 to label, revise, or augment existing edge attributes, thereby supporting richer semantic context during constraint resolution operations.

In an embodiment, graph construction module 236 includes a structural validation layer to verify graph coherence prior to persistence. For example, disconnected segments with high centrality scores may be flagged for reevaluation, and low-confidence or orphaned relationships may be quarantined for feedback or retraining loops. These validation routines contribute to system-level consistency and support the goal of enforcing structured knowledge constraints during query-time resolution.

Relationship annotation module 238 is operable to enrich and refine edge attributes within the graph structure generated by graph construction module 236. More specifically, relationship annotation module 238 applies schema-aware logic, domain-specific tagging, and contextual scoring mechanisms to enhance the semantic and structural information associated with inter-segment relationships.

In various embodiments, relationship annotation module 238 receives an edge map from graph construction module 236, wherein each edge denotes a directional connection between content segments. The module is configured to assign or update edge attributes including relationship type (e.g., "supports," "extends," "cites"), edge weight, provenance (e.g., model-generated, user-verified), temporal alignment, and schema compatibility class. An edge type taxonomy may be maintained by the system to ensure consistent tagging across ingestion sessions and support alignment with externally defined relationship schemas.

Relationship annotation module 238 may apply statistical classifiers, rule-based mapping tables, or machine-learned scoring functions to determine the appropriate annotation for each relationship. For instance, edges between segments drawn from different documents but exhibiting co-referential entities may be tagged with a "cross-document reference" type and assigned a confidence score reflecting co-occurrence frequency and name resolution certainty. In another example, hierarchical parent-child structures inferred through markup analysis or outline extraction may be reinforced with directional annotations denoting structural containment.

In certain embodiments, relationship annotation module 238 accesses a domain-specific constraint registry or schema ontology to determine whether each relationship conforms to valid graph patterns. Invalid, conflicting, or underspecified relationships may be flagged for downstream validation by data validation and integrity system 144 or isolated for manual feedback curation.

Relationship annotation module 238 is further operable to encode edge annotations as metadata objects stored in graph structure datastore 252. These annotations may be accessed at query time by constraint resolution logic within adaptive query execution and optimization system 148 to enforce semantic consistency and apply relationship-based filtering logic.

In some implementations, relationship annotation module 238 includes a feedback incorporation component that receives corrective inputs from user device(s) 155 or external systems. These feedback signals may be used to adjust annotation weights, retrain classifiers, or override incorrect edge labels, thereby supporting continual improvement of relationship tagging accuracy and relevance.

Index synchronization manager 240 is operable to coordinate data propagation, alignment, and state consistency between vector index datastore 250 and graph structure datastore 252. More specifically, index synchronization manager 240 ensures that content segments, embeddings, and relationships processed by segment parsing module 230, embedding generation module 232, relationship extraction module 234, and graph construction module 236 remain logically consistent and referentially intact across both index structures.

In various embodiments, index synchronization manager 240 maintains an internal mapping registry associating segment identifiers with corresponding vector entries and graph nodes. When a new segment is introduced or updated, the manager verifies that both its embedding (stored in vector index datastore 250) and its structural relationships (stored in graph structure datastore 252) reflect the latest data transformation state. Synchronization checkpoints may be enforced based on processing queue identifiers, content batch tags, or ingestion timestamps.

Index synchronization manager 240 includes logic to detect out-of-sync conditions, such as vector entries missing corresponding graph nodes, or graph nodes referencing obsolete or overwritten segments. In such cases, index synchronization manager 240 initiates corrective operations including regeneration of embeddings, re-invocation of relationship extraction, or purging of stale edge connections. These corrective steps are executed through coordinated calls to embedding generation module 232 and relationship extraction module 234, ensuring minimal disruption to active retrieval operations.

In certain implementations, index synchronization manager 240 maintains synchronization metadata—including version hashes, embedding lineage, and graph revision state—which may be used to validate cross-index consistency and support fault recovery scenarios. This metadata may be queried by data validation and integrity system 144 to evaluate structural completeness prior to query execution.

Index synchronization manager 240 may also support lock-based concurrency management or distributed transaction protocols when vector index datastore 250 and graph structure datastore 252 are deployed across partitioned or sharded infrastructures. These mechanisms ensure atomic propagation of updates and prevent race conditions between simultaneous ingestion or query operations.

Incremental update engine 242 is operable to perform real-time or scheduled updates to vector index datastore 250 and graph structure datastore 252 based on newly ingested or modified content segments. More specifically, incremental update engine 242 identifies content changes originating from document ingestion and preprocessing system interface 220 and orchestrates targeted reprocessing of affected segments without requiring full re-indexing of the entire corpus.

In various embodiments, incremental update engine 242 receives a delta manifest describing added, modified, or removed segments, along with associated metadata such as ingestion timestamps, document lineage, or triggering user actions. For each affected segment, incremental update engine 242 invokes embedding generation module 232 and relationship extraction module 234 to regenerate the corresponding vector representation and structural connections.

Upon detecting that an update alters an existing relationship or embedding, incremental update engine 242 coordinates with graph construction module 236 and index synchronization manager 240 to invalidate obsolete graph nodes, purge outdated vector entries, and register the revised content within both index structures. Update propagation logic may include dependency tracking and re-evaluation of adjacent nodes to ensure contextual consistency.

In certain embodiments, incremental update engine 242 maintains an update queue with priority ordering based on recency, usage frequency, or confidence degradation metrics. This queue may be shared with or monitored by adaptive query execution and optimization system 148 to inform re-ranking heuristics or blueprint adjustments following segment revisions.

Incremental update engine 242 may also perform periodic compaction of stale index entries and pruning of disconnected graph nodes, based on configurable retention policies or semantic relevance thresholds. When operating in distributed environments, the engine applies version-controlled synchronization procedures to avoid index divergence, including transactional commit coordination and conflict resolution strategies.

Vector index datastore 250 is operable to store and organize the vector embeddings generated by embedding generation module 232 for use in similarity-based content retrieval. More specifically, vector index datastore 250 maintains a searchable structure of high-dimensional vectors, each corresponding to a content segment processed through the dual-indexing pipeline, and enables rapid approximate nearest-neighbor (ANN) retrieval during query execution.

In various embodiments, each vector stored in vector index datastore 250 is associated with metadata including the segment identifier, source document ID, ingestion timestamp, and document class. The datastore may be configured to support partitioned or hierarchical indexing structures— such as k-d trees, hierarchical navigable small world (HNSW) graphs, or product quantization techniques—depending on performance and scalability requirements. These structures enable low-latency semantic lookup over large-scale content corpora.

Vector index datastore 250 is updated continuously through operations initiated by index synchronization manager 240 and incremental update engine 242. When a content segment is added or modified, its corresponding vector representation is inserted or replaced within the datastore, and obsolete entries are removed based on unique segment identifiers or hash-based validation.

In certain embodiments, vector index datastore 250 supports partial reloading or hot-swapping of index shards during system operation, enabling runtime scaling and recovery. When deployed in distributed environments, vector index datastore 250 may use sharding strategies and replication protocols to ensure availability and consistency across nodes. Query operations can be distributed across shards using locality-sensitive hashing (LSH) or other routing techniques.

The vector index may also include versioning controls, allowing prior embeddings to be retained for audit or rollback purposes, and enabling adaptive query execution and optimization system 148 to compare vector drift over time for the same content segment.

Graph structure datastore 252 is operable to maintain the structured relationship graph generated by graph construction module 236 and annotated by relationship annotation module 238. More specifically, graph structure datastore 252 stores graph nodes representing individual content segments and directed edges representing inter-segment relationships, along with associated metadata, edge types, and annotations used for constraint-based retrieval.

Each node in graph structure datastore 252 includes attributes such as segment ID, source document ID, segment position, and versioning metadata. Edges between nodes encode relationship types—such as citation, containment, temporal sequence, or semantic reference—and may further include directional indicators, confidence scores, and tags derived from relationship annotation module 238. In certain embodiments, the graph supports multi-typed or multiplex edges to capture overlapping or hierarchical relationship sets between segments.

Graph structure datastore 252 may be implemented using a property graph model or labeled directed multigraph and is operable to support traversal queries issued by adaptive query execution and optimization system 148 during constraint resolution. In one implementation, graph structure datastore 252 supports traversal operations using algorithms such as depth-first search, breadth-first search, or schema-constrained pattern matching, depending on query requirements.

To support efficient retrieval and update operations, graph structure datastore 252 may maintain adjacency lists, index structures over node and edge properties, and time-based lineage snapshots. The datastore may further track which nodes and edges were generated or updated during specific ingestion cycles to support rollback, auditing, or fine-grained reprocessing.

In distributed implementations, graph structure datastore 252 can be partitioned across multiple machines using vertex-cut or edge-cut strategies. Synchronization across partitions may be handled using distributed coordination protocols and consistency layers to ensure traversal operations remain logically complete and reproducible. Updates received from incremental update engine 242 are propagated through appropriate graph partitions, and impacted sub-graphs are flagged for index synchronization.

In some embodiments, graph structure datastore 252 includes facilities for caching high-frequency traversal results or constraint resolution pathways, supporting low-latency response times during interactive query execution.

FIG. 3 illustrates an exemplary embodiment of the internal components of adaptive query execution and optimization system 148, in accordance with various embodiments. As shown, adaptive query execution and optimization system 148 includes user device interface 302, data processing and transformation system interface 304, structured data management and output system interface 306, data validation and integrity system interface 308, interaction monitoring module 310, query construction engine 312, vector retrieval engine 314, graph traversal engine 316, constraint resolution engine 318, unified ranking engine 320, response synthesis pipeline 322, feedback incorporation module 324, user interaction datastore 330, query response history datastore 332, and feedback signal datastore 334.

User device interface 302 is operable to manage communication between adaptive query execution and optimization system 148 and user device(s) 155. More specifically, user device interface 302 receives query input data submitted via graphical user interface elements, API calls, or embedded software modules operating on user device(s) 155. This input may include structured prompts, natural language queries, or predefined retrieval intents. User device interface 302 is further operable to transmit response data, relevance-ranked results, and feedback cues to user device(s) 155 following execution of the retrieval process.

For example, user device interface 302 may receive a natural language query submitted through a browser-based interface, parse the input payload, assign a session identifier, and forward the structured request to query construction engine 312. In reverse flow, user device interface 302 may receive a composite response package from response synthesis pipeline 322 and format it into a presentation-ready form (e.g., JSON or HTML) suitable for rendering on user device(s) 155.

In certain embodiments, user device interface 302 may support asynchronous query submission and retrieval workflows, allowing user interactions to persist across disconnected sessions. User device interface 302 may also assign user-level metadata, such as access tier, usage limits, or prior interaction history, for integration into constraint resolution engine 318 or feedback incorporation module 324. Transport mechanisms may include RESTful HTTP over TLS, gRPC streams, or WebSocket channels, depending on deployment context.

In some implementations, user device interface 302 may incorporate input normalization, error-handling logic, or client-specific formatting adapters to ensure consistent communication across heterogeneous user environments.

Data processing and transformation system interface 304 is operable to coordinate the flow of content segments, index structures, and semantic annotations between adaptive query execution and optimization system 148 and data processing and transformation system 142. More specifically, data processing and transformation system interface 304 is operable to retrieve vector embeddings and relationship graph structures associated with pre-indexed content segments for use in query resolution, constraint enforcement, and ranking workflows.

For example, when a user query is received and transformed by query construction engine 312, data processing and transformation system interface 304 may retrieve corresponding candidate vector entries from a vector index datastore 250 or initiate traversal seed identification based on graph structure datastore 252. Data processing and transformation system interface 304 enables concurrent access to both vector-based and relationship-based representations, ensuring that dual-path retrieval logic executed by vector retrieval engine 314 and graph traversal engine 316 operates on synchronized data snapshots.

In certain embodiments, data processing and transformation system interface 304 supports interface-specific query parameters for range limitation, semantic similarity thresholding, graph edge-type filtering, or versioning metadata. This enables adaptive query execution and optimization system 148 to tailor its retrieval scope and resolution fidelity based on real-time request attributes and historical signal context.

In some implementations, data processing and transformation system interface 304 maintains interface caches or staging buffers to mitigate latency associated with repeated vector fetches or graph traversals, especially under high-concurrency conditions. Consistency protocols may be employed to align reference pointers used during constraint resolution engine 318 operations, particularly when incremental updates from incremental update engine 242 are active.

Structured data management and output system interface 306 is operable to exchange finalized query results, ranking metadata, and associated context with structured data management and output system 146. More specifically, structured data management and output system interface 306 transmits synthesized query responses generated by response synthesis pipeline 322, as well as ranking explanations, segment provenance, and associated metadata compiled during constraint resolution and scoring.

For example, structured data management and output system interface 306 may receive a ranked list of content segments selected by unified ranking engine 320, enriched with metadata derived from user interaction datastore 330 and feedback signal datastore 334. This interface formats and transmits those results to structured data management and output system 146 for logging, distribution to user devices 155, or integration with external systems via export APIs.

In certain embodiments, structured data management and output system interface 306 includes formatting logic operable to align response content with schema-defined output templates, adjust scoring metadata for compatibility with visualization tools, and redact context elements based on access control metadata. The interface may apply output normalization rules to harmonize representations of semantically equivalent segments or annotate results with historical usage indicators.

In some implementations, structured data management and output system interface 306 may also receive relevance signals or override directives from structured data management and output system 146. For example, if a content segment selected by unified ranking engine 320 is known to be deprecated or previously rejected, structured data management and output system interface 306 may trigger reranking or substitute segment logic based on override rules, user roles, or domain-specific response guidelines.

Data validation and integrity system interface 308 is operable to facilitate the exchange of validation results, integrity assessments, and graph consistency feedback between adaptive query execution and optimization system 148 and data validation and integrity system 144. More specifically, data validation and integrity system interface 308 receives feedback pertaining to segment coherence, graph traversal correctness, constraint evaluation outcomes, and scoring anomalies identified during execution of query resolution workflows.

For example, when constraint resolution engine 318 evaluates candidate content segments against graph-encoded structural relationships, data validation and integrity system interface 308 may receive consistency signals or mismatch alerts from data validation and integrity system 144 indicating violations of directional edge expectations, invalid or deprecated relationship types, or incoherence in the graph paths supporting a candidate's inclusion. These signals may be recorded to feedback signal datastore 334 or used to dynamically adjust constraint scoring thresholds in constraint resolution engine 318.

In certain embodiments, data validation and integrity system interface 308 is further operable to submit inferred graph inconsistencies, unexpected relationship traversal outcomes, or discrepancies in vector-graph correlation to data validation and integrity system 144 for recomputation or logging. For instance, if graph traversal engine 316 identifies structural loops or unreachable nodes in the relationship graph that contradict prior indexing outputs, these issues may be reported through data validation and integrity system interface 308 to trigger incremental reconciliation or edge correction processes.

In some implementations, data validation and integrity system interface 308 includes logic to prioritize or defer validation checks based on query complexity, retrieval latency targets, or user privilege levels. The interface may enable streaming of validation traces or summaries back to the query execution system to support post-query analysis or explainability pipelines within response synthesis pipeline 322.

Interaction monitoring module 310 is operable to capture, record, and analyze user interaction events originating from user device(s) 155 during query lifecycle execution. More specifically, interaction monitoring module 310 receives structured inputs reflecting actions such as query submission, result selection, rejection, scrolling behavior, follow-up query initiation, and response refinement, and assigns event metadata including timestamps, session identifiers, query context indicators, and interaction outcome labels.

For example, when a user initiates a semantic query through user device interface 302, interaction monitoring module 310 records the initial request parameters and query formulation metadata. Upon presentation of results generated by response synthesis pipeline 322, interaction monitoring module 310 tracks which content segments are clicked, dismissed, expanded, or ignored, and whether the user revises the query or navigates to related documents. This sequence of actions is encoded into an interaction trace that captures both discrete and aggregate behavioral signals.

In certain embodiments, interaction monitoring module 310 is operable to compute interaction-derived metrics such as dwell time per result, skip rates, and normalized click position, and transmits such metrics to feedback incorporation module 324 to support scoring reweighting, graph edge adjustment, or constraint calibration. In some implementations, interaction monitoring module 310 differentiates between authenticated and unauthenticated sessions, applies rate-limiting thresholds, and filters bot-originated events from user feedback analysis pipelines.

In addition, interaction monitoring module 310 may segment interactions based on query class, content domain, or retrieval path used (e.g., vector retrieval or graph traversal), enabling correlation of behavior patterns with execution parameters. Recorded events may be stored in user interaction datastore 330 and cross-referenced with entries in query response history datastore 332 to support longitudinal tracking of query performance and adaptive tuning of retrieval workflows.

Query construction engine 312 is operable to transform user-submitted search requests into structured, machine-executable query representations suitable for semantic and structural retrieval operations. More specifically, query construction engine 312 receives input data from user device interface 302 and interaction monitoring module 310, parses the content to identify intent, contextual constraints, and target concepts, and produces normalized query objects formatted for use by vector retrieval engine 314 and graph traversal engine 316.

For example, query construction engine 312 may apply tokenization, syntactic parsing, and vector-based disambiguation techniques to extract one or more query targets from a natural language prompt. Contextual constraints such as document type filters, relationship depth limits, or date bounds may be inferred from explicit query syntax or recent user interaction patterns. These constraints are encoded into a structured query object that conforms to schema definitions used by other components of adaptive query execution and optimization system 148.

In certain embodiments, query construction engine 312 applies blueprint-based instruction sets or model-generated prompts to enforce query formatting requirements. For instance, queries involving hierarchical segment traversal may be assigned traversal boundary rules, while those invoking semantic filtering may be annotated with weighting parameters governing vector similarity thresholds. These instruction sets may be conditionally applied based on query type or past performance metrics retrieved from query response history datastore 332.

Query construction engine 312 may additionally generate execution flags indicating whether the retrieval focus should be biased toward semantic precision, structural validation, or unified evidence scoring. These flags are embedded within the structured query object and consumed by both vector retrieval engine 314 and graph traversal engine 316. The dual-path query execution initiated by this component preserves architectural decoupling while enabling coordinated constraint enforcement and score normalization by constraint resolution engine 318.

Query construction engine 312 may also include normalization logic to standardize query metadata, such as converting relative timeframes (e.g., "last quarter") to absolute date ranges, or mapping ambiguous field names to canonical schema-aligned labels. This normalization supports consistent processing across heterogeneous query formulations and ensures compatibility with indexing formats maintained by data processing and transformation system 142 and structured data management and output system 146.

Vector retrieval engine 314 is operable to identify semantically relevant content segments based on the vectorized representation of an incoming query. More specifically, vector retrieval engine 314 receives a structured query object from query construction engine 312, extracts the semantic vector representation embedded therein, and performs similarity-based retrieval over vector index datastore 250 maintained by data processing and transformation system 142.

For example, vector retrieval engine 314 may apply approximate nearest neighbor (ANN) search algorithms, such as hierarchical navigable small world (HNSW) graphs or product quantization techniques, to locate vector entries corresponding to content segments with high cosine similarity to the query vector. Retrieved segment identifiers are ranked based on similarity score and filtered to remove segments previously marked invalid or stale due to recent updates.

In certain embodiments, vector retrieval engine 314 includes configurable distance metrics, vector normalization techniques, and adaptive threshold settings based on query type, historical match quality, or inferred user intent. For instance, the engine may apply a higher similarity threshold for fact-based queries or reduce the vector dimensionality during high-throughput conditions to improve latency without substantially affecting precision.

Vector retrieval engine 314 may additionally support multi-vector queries comprising composite representations. In such cases, the engine may compute independent retrieval results for each sub-vector and apply aggregation techniques—such as weighted merging, intersection filtering, or score blending—to produce a consolidated candidate set. These multi-vector operations are particularly useful in cases involving concept disambiguation, multi-intent search prompts, or compound entity references.

In some embodiments, vector retrieval engine 314 maintains retrieval logs for each query execution, capturing metrics such as match count, top-N score distribution, and segment identifier frequency. These logs may be ingested by feedback incorporation module 324 to inform future adjustments to similarity thresholds or vector embedding configurations, thereby contributing to the adaptive behavior of the retrieval system.

Graph traversal engine 316 is operable to identify content segments that satisfy one or more structured knowledge constraints associated with an input query. More specifically, graph traversal engine 316 receives a structured query object from query construction engine 312 and initiates traversal operations across the relationship graph maintained within graph structure datastore 252 of data processing and transformation system 142. The relationship graph includes nodes corresponding to content segments and edges annotated with one or more relationship types, directions, weights, or temporal indicators.

In operation, graph traversal engine 316 determines an appropriate traversal strategy based on parameters derived from the structured query object. These strategies may include breadth-first traversal with depth constraints, weighted shortest-path resolution, or predicate-based edge filtering. For example, when a query specifies that results must be supported by prior citations or belong to a defined hierarchical lineage, graph traversal engine 316 may constrain its traversal to directed edges labeled as citations or parent-child relationships, respectively.

Graph traversal engine 316 evaluates the relevance of candidate paths by assigning traversal scores to each node encountered. Scoring may incorporate edge type weightings, node metadata (e.g., document class, publication date), or contextual filters derived from the original query. Candidate segments returned from the traversal process are prioritized based on accumulated traversal scores and annotated with traversal metadata, such as supporting edge chains or validation context.

In certain embodiments, graph traversal engine 316 supports dynamic traversal scope adjustment based on system load or user-configured resource limits. For instance, traversal depth may be limited during peak query volume, or traversal may terminate early if a threshold number of qualifying segments has been identified. These controls are enforced by the index synchronization manager 240 and may be configured globally or per-query.

In some implementations, graph traversal engine 316 maintains traversal history logs including path structures, decision points, and rejected branches. This history may be referenced by constraint resolution engine 318 or feedback incorporation module 324 to inform constraint scoring decisions and refine traversal heuristics in subsequent queries.

Constraint resolution engine 318 is operable to reconcile and validate candidate content segments identified through semantic similarity and structured relationship traversal. More specifically, constraint resolution engine 318 receives two independently generated candidate segment sets: one from vector retrieval engine 314 based on vector embedding similarity, and another from graph traversal engine 316 based on structured relationship satisfaction. Constraint resolution engine 318 performs alignment, scoring, and filtering operations to produce a unified result set consistent with both semantic and structural criteria.

Constraint resolution engine 318 applies a set of scoring functions to evaluate the degree of agreement between the vector-based and graph-based retrieval paths. For each candidate content segment, the system computes a resolution score that reflects both the vector similarity score and the graph traversal score, optionally adjusted by alignment metrics such as content overlap, segment continuity, or co-reference indicators. Scoring functions may include weighted linear combinations, threshold-based gating, or hierarchical resolution logic depending on system configuration and query context.

Constraint resolution engine 318 is further operable to apply diversity and disambiguation rules when multiple candidates achieve similar scores. For example, when two segments are semantically similar but only one satisfies a critical graph constraint (e.g., direct citation from a primary source), the system may elevate that candidate in the unified ranking. In some embodiments, constraint resolution engine 318 utilizes edge metadata—such as relationship type, directionality, or confidence—to prioritize or exclude segments during constraint evaluation.

Constraint resolution engine 318 may also incorporate normalization functions to adjust for systemic bias in retrieval scoring. For instance, vector similarity scores may be scaled logarithmically to account for high baseline similarity in long documents, while graph traversal scores may be adjusted to reflect edge sparsity or relationship density. These normalization techniques ensure that resolution scoring remains balanced across heterogeneous content corpora. In certain implementations, constraint resolution engine 318 supports query-specific constraint templates that enforce domain-specific structural expectations. For example, in technical literature search, a template may require that all returned segments be connected to at least one peer-reviewed reference. Constraint resolution engine 318 can dynamically load and apply these templates during scoring and filtering, allowing retrieval behavior to be tailored per query domain.

Constraint resolution engine 318 outputs a unified result set annotated with score metadata, relationship provenance, and resolution trace information. This output is passed to unified ranking engine 320 for final ordering. In some embodiments, constraint resolution engine 318 caches partial resolution results for reuse in related queries or iterative refinement scenarios.

Unified ranking engine 320 is operable to generate an ordered list of candidate content segments based on scoring outputs from constraint resolution engine 318. More specifically, unified ranking engine 320 receives resolution-adjusted segment scores that reflect both semantic similarity and structured relationship alignment and applies a final ranking algorithm to produce a prioritized result set suitable for response synthesis and presentation.

Unified ranking engine 320 may apply a weighted ranking function that considers the constraint resolution score as a primary input while incorporating auxiliary ranking features, such as user interaction history (e.g., prior selections or rejections), recency or temporal context, and document-level relevance metrics. In certain embodiments, a boosting strategy may be applied to favor segments that have previously demonstrated high engagement or low rejection rates in response to similar query profiles.

Unified ranking engine 320 is further operable to enforce diversity constraints that prevent over-concentration of results from a single document, author, or structural branch of the graph. For example, the system may limit the number of consecutively ranked segments originating from the same source document or those connected to the same relationship cluster. This ensures broader topical coverage and enhances the interpretability of the ranked results.

Unified ranking engine 320 may also implement tiered ranking logic, where results are grouped into confidence bands or scoring strata based on constraint satisfaction thresholds. For instance, segments satisfying both semantic similarity and direct graph connectivity may be placed in a top tier, while segments satisfying only indirect constraints may be placed in a secondary tier. This stratification enables downstream components, such as response synthesis pipeline 322, to tailor presentation formatting based on the strength of the segment's retrieval justification.

In some embodiments, unified ranking engine 320 supports runtime adjustment of ranking parameters based on dynamic query metadata. For example, if the query contains temporal constraints or explicit relationship directives (e.g., "explain in context of prior ruling"), the engine may adjust weighting factors or ranking templates accordingly. This dynamic tuning capability allows the ranking process to respond to evolving information needs and contextual requirements.

Unified ranking engine 320 outputs the ordered segment list to response synthesis pipeline 322 for further formatting, annotation, or user interface preparation. In certain configurations, the output may also include rationale metadata or retrieval diagnostics, such as the top contributing vector and graph features, supporting interpretability or audit requirements.

Response synthesis pipeline 322 is operable to assemble, annotate, and format a final response based on the ranked content segments generated by unified ranking engine 320. More specifically, response synthesis pipeline 322 interprets the prioritized result set, retrieves corresponding content segment payloads from structured data management and output system 146, and constructs a coherent, machine-readable or user-presentable output aligned with the active query intent and formatting requirements.

Response synthesis pipeline 322 may include logic to concatenate multiple ranked content segments while preserving segment boundaries, document lineage, and associated metadata. For instance, segments originating from separate source documents may be assembled in an order that reflects their relevance rank while maintaining source attribution and positional indicators. Formatting instructions may be applied to emphasize key terms, highlight relationship-aligned content, or delineate results by semantic topic or structural cluster.

In certain embodiments, response synthesis pipeline 322 is operable to apply response templating logic based on query classification. For example, fact-finding queries may trigger a bullet-pointed extraction of supported statements, while contextual summary requests may generate paragraph-level syntheses. These templating modes are selected based on query attributes extracted by query construction engine 312 and contextual signals from data processing and transformation system 142.

Response synthesis pipeline 322 may further embed explanatory annotations derived from constraint resolution engine 318, such as indicators of which retrieval path validated the content (e.g., vector match, graph match, or both), connection strength scores, or relationship types involved in justification. In some configurations, these annotations are exposed to the user to support trust, interpretability, or audit tracking.

In certain implementations, response synthesis pipeline 322 supports multi-format rendering, allowing response output to be presented in web interfaces, exported in structured formats (e.g., JSON or XML), or transmitted via API endpoints to external systems. Output formatting logic may be modularized to adapt responses to different consumption targets, such as mobile UIs, reporting dashboards, or machine agents.

Response synthesis pipeline 322 may also be operable to log response generation metadata to query response history datastore 332, ensuring traceability of synthesis decisions, configuration states, and component contributions for future analysis or debugging workflows.

Feedback incorporation module 324 is operable to analyze user interaction signals and adjust internal parameters of adaptive query execution and optimization system 148 to refine subsequent retrieval and ranking operations. More specifically, feedback incorporation module 324 monitors behavior associated with user engagements—such as selections, rejections, dwell time, and reformulated queries-originating from user device(s) 155 or collected from interaction monitoring module 310, and translates these into structured feedback signals used to update retrieval heuristics, graph edge weights, and ranking configurations.

Feedback incorporation module 324 may normalize raw interaction metrics across user sessions and query types, segmenting them into positive and negative signals based on predefined thresholds or learned relevance models. For example, repeated selection of a content segment across different queries may increase its inferred utility, while consistent user skipping or replacement queries may lower its contribution to future rankings. These adjustments can be applied to query response history datastore 332 or reflected directly in the vector relevance scores or graph traversal paths used by vector retrieval engine 314 and graph traversal engine 316, respectively.

In certain embodiments, feedback incorporation module 324 may reweight edges in the relationship graph stored in graph structure datastore 252 based on co-selection patterns. For instance, if users frequently engage with two segments retrieved via different paths but belonging to a common structural node, the edge between them may be reinforced, enabling the graph structure to more accurately reflect user-valued associations. Similarly, low-engagement nodes may be demoted or decoupled through attenuation logic applied to connection metadata or edge traversal scores.

Feedback incorporation module 324 may also maintain a feedback signal datastore 334 that stores structured representations of historical interaction patterns, feedback-adjusted edge weights, and learned ranking parameters. These feedback representations can support both real-time updates to active sessions and periodic retraining of query construction templates or constraint resolution heuristics.

In certain implementations, feedback incorporation module 324 supports selective user-specific or cohort-based learning, allowing personalized adjustments to query handling logic while preserving general model stability across shared contexts. This capability enables hybrid retrieval workflows that combine general knowledge constraints with individualized content preferences.

User interaction datastore 330 is operable to store structured representations of interaction signals originating from user device(s) 155 and captured by interaction monitoring module 310. More specifically, user interaction datastore 330 records events such as query submission timestamps, selected or ignored content segments, dwell times on result items, click-through sequences, and reformulation patterns that arise during engagement with semantic retrieval workflows.

User interaction datastore 330 maintains this data in structured formats aligned with predefined schemas, including fields for query identifiers, segment IDs, ranked position, user session metadata, and interaction types. These structured representations allow for efficient aggregation, filtering, and analysis by feedback incorporation module 324 and other components of adaptive query execution and optimization system 148.

In certain embodiments, user interaction datastore 330 may partition interaction data by user session, cohort, or time window, enabling decoupled evaluation of short-term and long-term retrieval behaviors. For example, recent query interactions may be given higher weight during rapid adaptation cycles, while historical interaction data may be used to calibrate persistent ranking heuristics or validate updated graph structures.

User interaction datastore 330 may also store auxiliary metrics generated during runtime inference, including predicted relevance scores, confidence values, and tie-breaking metadata produced by unified ranking engine 320. These metrics enable contextual analysis of user engagement outcomes relative to system-generated expectations.

In implementations where privacy or regulatory compliance is required, user interaction datastore 330 may support pseudonymization, encryption at rest, or role-based access controls to restrict visibility into user-level interaction histories. These safeguards ensure that adaptive learning processes preserve data integrity while aligning with security requirements.

Query response history datastore 332 is operable to store historical associations between received user queries and the corresponding response sets generated by adaptive query execution and optimization system 148. More specifically, query response history datastore 332 maintains structured records that pair each submitted query instance with the final ranked result list returned to the user, including metadata describing constraint resolution outcomes, retrieval path behaviors, and ranking adjustments applied at inference time.

Query response history datastore 332 may store, for each query instance, a normalized representation of the query text, semantic embedding, retrieval context attributes, and a record of segments returned in the response, including their vector similarity scores, graph validation status, and unified ranking position. This enables retrospective inspection of prior system decisions and supports longitudinal analysis of retrieval behavior over time.

In certain embodiments, query response history datastore 332 is indexed by query fingerprints or content hashes to facilitate deduplication and lookup during interaction replays, relevance training sessions, or regression validation pipelines. These lookups enable the system to identify previously seen queries, evaluate behavioral drift, and detect regressions in relevance scoring across content updates.

Query response history datastore 332 may be used by feedback incorporation module 324 to correlate changes in user interaction behavior with prior response formats. For example, if a segment repeatedly appears in the top rank position but is consistently skipped by users, the historical record can inform adaptive demotion logic or initiate reevaluation of edge weights in the relationship graph.

Additionally, query response history datastore 332 may support TTL (time-to-live) policies, batch archival strategies, or tiered storage mechanisms that allow ephemeral queries to expire while preserving high-value interaction traces for sustained training and audit purposes. These lifecycle controls ensure efficient use of storage resources without sacrificing access to critical historical inference data.

Feedback signal datastore 334 is operable to store structured feedback signals derived from user interactions with query results, system-level annotations, or externally validated relevance metrics. More specifically, feedback signal datastore 334 retains data elements used to guide ongoing adjustment of graph edge weights, retrieval scoring logic, and constraint resolution parameters across adaptive query execution and optimization system 148.

Feedback signal datastore 334 may include, for each feedback entry, a reference to the originating query instance, an identifier of the affected content segment, a feedback type (e.g., positive, negative, skip, dwell time threshold exceeded), a timestamp, and optionally a feedback confidence or source flag (e.g., explicit user action, system-derived signal, or human annotation layer). These fields provide a normalized representation of heterogeneous interaction evidence suitable for aggregation, scoring, and incorporation into machine-enforced relevance models.

In certain embodiments, feedback signal datastore 334 operates in conjunction with user interaction datastore 330 and query response history datastore 332 to contextualize signal strength, isolate anomalous patterns, and prioritize high-confidence training examples. For example, feedback signal datastore 334 may include differential weighting rules based on recency, user identity, segment age, or content volatility, enabling feedback incorporation module 324 to apply weighted learning logic when updating relevance parameters.

Feedback signal datastore 334 may support rolling window retention, batched signal scoring, or online signal streaming pipelines, depending on system architecture and training cadence. In some implementations, signal normalization procedures are applied prior to persistence, including outlier suppression, timestamp alignment, and feedback deduplication, ensuring that only actionable, statistically relevant signals are retained.

Additionally, feedback signal datastore 334 may be queried by constraint resolution engine 318 to influence ranking tie-breaks or trigger alternate resolution heuristics in response to observed feedback-driven retrieval errors. For instance, if a segment with high semantic similarity has accumulated consistent negative feedback due to contextual mismatch, this record may enable preemptive filtering or dynamic score attenuation during subsequent resolution cycles.

FIG. 4 illustrates an exemplary process flow for augmenting semantic search using structured knowledge constraints, in accordance with various embodiments. The steps shown represent operations performed by one or more components of the system, including document ingestion and preprocessing system 140, data processing and transformation system 142, and adaptive query execution and optimization system 148, as described in FIG. 1, FIG. 2, and FIG. 3. The process may include additional steps, fewer steps, or steps executed in a different order without departing from the scope of the invention, as would be apparent to one of ordinary skill in the art.

In step 402, content segments from one or more source documents are obtained. A content segment represents a distinct portion of a document, which may include text, structured markup, or embedded metadata derived from the original file. Source documents may include digitized or native-format materials such as PDFs, HTML files, technical papers, policy handbooks, or regulatory filings. Content segments may be logically defined at a paragraph level, section heading level, or based on structural delineators such as HTML tags, PDF object hierarchy, or XML nodes.

In certain embodiments, document ingestion and preprocessing system 140 is operable to receive unstructured or semi-structured documents and partition each document into a plurality of content segments. Segmentation may be performed using boundary detection rules that rely on markup tags (e.g., <p>, <section>), style attributes (e.g., font size, bolding, indentation), visual layout indicators, or structural elements extracted via document object models. Each segment is assigned metadata attributes including its source document identifier, position within the original file, logical sequence, and document class, which are used to preserve lineage during later indexing and validation stages.

In some embodiments, segmentation instructions may be schema-driven or adaptively selected based on the document class or originating source system. For example, a financial policy document retrieved from third-party data sources 158 may be segmented at the clause level, whereas a product manual may be segmented at the section-subsection level. In certain configurations, preprocessing may include optical character recognition (OCR), markup repair, or format normalization to ensure segment-level consistency prior to vectorization and relationship modeling.

In step 404, vector embeddings are generated for individual content segments. Each embedding represents a high-dimensional numerical encoding of the semantic content of a given segment, allowing semantically similar segments to be compared and retrieved based on vector proximity.

In certain embodiments, data processing and transformation system 142 is operable to process each content segment through embedding generation module 232, which applies transformer-based language models to produce context-aware semantic embeddings. The model may operate on entire segments or sub-segment token windows, depending on the embedding dimensionality, model architecture, and configured inference parameters. In various implementations, the embedding generation module 232 may utilize pre-trained or fine-tuned models (e.g., BERT, ROBERTa, or domain-specific transformer variants) to capture linguistic meaning, contextual cues, and domain-specific intent from the segment text.

For example, a content segment describing a company's ESG policy may be embedded into a vector space in which neighboring points correspond to segments describing environmental initiatives, sustainability disclosures, or regulatory compliance. In some embodiments, embeddings are generated using model pipelines that include tokenization, attention-weighted context encoding, and optional dimensionality reduction through projection layers or quantization techniques. Each generated embedding is associated with the corresponding content segment identifier and passed to subsequent indexing and retrieval components.

Where appropriate, embeddings may also encode auxiliary features such as source document class, segment type, or inferred topic label, either through feature concatenation or vector extension. These extended representations allow the system to preserve nuanced relationships between segments that might otherwise be indistinguishable in standard semantic spaces.

In step 406, structured relationships between content segments are extracted. These relationships represent explicit or inferred connections-logical, semantic, or referential-among distinct segments within or across source documents, forming the basis for graph-based validation and constraint resolution during retrieval.

In certain embodiments, data processing and transformation system 142 is operable to extract these relationships using relationship extraction module 234. Relationship extraction module 234 analyzes the content of individual segments, associated metadata, and cross-referenced references to identify one-to-one, one-to-many, or many-to-many connections. These relationships may be derived from explicit textual indicators (e.g., citations, hyperlinks, footnotes), semantic alignment between segment content, or hierarchical positioning within a document structure (e.g., sections and subsections).

For example, relationship extraction module 234 may identify that a segment titled "Risk Factors" in one document references findings described in a prior "Executive Summary" segment from a related filing. In another case, extracted relationships may capture parent-child associations between segments in XML-based documents, allowing for lineage tracking and structured traversal. The module may utilize dependency parsing, coreference resolution, or named entity graphing to determine implicit links between segments lacking formal references.

Each identified relationship is encoded with metadata including source and target segment identifiers, relationship type (e.g., citation, elaboration, contradiction), and directionality. These relationships are then output for integration into the system's structured graph representation maintained by graph construction module 236.

In step 408, vector embeddings and structured relationships are maintained in parallel index structures to support dual-path retrieval workflows. This parallel maintenance enables the system to independently store and update both semantic similarity representations and structured connectivity information, allowing subsequent retrieval operations to reference either path without conversion or reprocessing delays.

In certain embodiments, data processing and transformation system 142 is operable to perform this function using index synchronization manager 240, vector index datastore 250, and graph structure datastore 252. Vector index datastore 250 is operable to store high-dimensional vector representations generated by embedding generation module 232 for each content segment. These vectors may be organized using approximate nearest neighbor indexing techniques (e.g., HNSW, IVF, PQ), and include segment identifiers, timestamp metadata, and embedding version lineage to support re-indexing and compatibility checks.

Graph structure datastore 252 is operable to store a graph representation constructed by graph construction module 236. The graph includes nodes representing individual content segments and edges representing the extracted relationships identified in step 406. Edges are annotated with relationship type, directionality, and contextual metadata. The graph structure supports traversal operations and may be periodically compacted or normalized to maintain traversal efficiency and structural consistency.

Index synchronization manager 240 coordinates updates between vector index datastore 250 and graph structure datastore 252. For example, when a new content segment is added, index synchronization manager 240 ensures that the corresponding vector is inserted into vector index datastore 250 and any associated relationships are reflected in graph structure datastore 252. Similarly, when a segment is removed or modified, the synchronization process propagates the update across both datastores and invalidates any precomputed paths or similarity caches affected by the change. In certain embodiments, the parallel index structures are deployed in distributed environments with partition-aware consistency logic, supporting fault-tolerant and scalable access during query execution.

In step 410, a search query is received for content retrieval. The search query may include a natural language question, a keyword-based prompt, a structured request with domain-specific constraints, or any other user-initiated input seeking semantically relevant content segments from the indexed corpus.

In certain embodiments, adaptive query execution and optimization system 148 is operable to receive the search query via user device interface 302. The search query may be transmitted from a user device 155 over network 104 and may originate from a graphical user interface, programmatic API call, or batch processing pipeline. User device interface 302 is operable to parse the incoming request, extract query metadata (e.g., query timestamp, session ID, user role), and normalize the input into a standardized internal representation suitable for downstream processing.

The standardized query representation may include tokenized input strings, embedded vectors generated via internal language models, and constraint flags for schema alignment, document type restriction, or relationship-specific filtering. In certain embodiments, adaptive query execution and optimization system 148 invokes query construction engine 312 to refine or augment the received query based on prior interactions, query context history, or domain-specific tuning parameters.

Query construction engine 312 may further incorporate information retrieved from query response history datastore 332 and user interaction datastore 330 to personalize the query context or apply learned preferences, such as filtering out previously rejected content or prioritizing segments with specific edge types. The fully formed query object is passed to the retrieval components of the system, initiating the semantic and structural search processes described in subsequent steps.

In step 412, the system searches the vector index to identify content segments that are semantically similar to the received query. This search process is based on comparing the embedded representation of the query against precomputed vector embeddings of content segments stored in a vector index datastore 250.

In certain embodiments, adaptive query execution and optimization system 148 is operable to perform this semantic similarity search using vector retrieval engine 314. Vector retrieval engine 314 receives the standardized query object and generates one or more query embeddings using the same model or embedding generation pipeline previously applied to content segments during indexing (see FIG. 2). The embeddings may be generated using transformer-based language models, domain-specific encoders, or parameterized inference instructions that align with the semantic structure of the corpus.

Vector retrieval engine 314 compares the query embedding to stored content segment embeddings in vector index datastore 250 using similarity metrics such as cosine similarity, dot product, or other distance-based measures. For each comparison, a relevance score is computed, indicating the degree of semantic alignment between the query and the corresponding content segment.

In some embodiments, the vector index is partitioned by document class, schema type, or domain-specific clusters, enabling efficient parallel retrieval and reducing the search space. Vector retrieval engine 314 may apply additional filtering logic based on metadata associated with the content segments—such as source document type, segment position, or recency—to enforce context-specific constraints prior to final ranking.

The output of this step includes a list of semantically similar candidate segments, each paired with an associated similarity score and metadata for subsequent validation and refinement. These candidate segments are passed to constraint resolution engine 318 for comparison against structurally validated segments retrieved via graph traversal logic in the following step.

In step 414, the system traverses the graph structure to identify content segments that are contextually connected to the received query. This traversal operates over the graph structure datastore 252, which encodes inter-segment relationships as edges between nodes representing individual content segments.

In certain embodiments, adaptive query execution and optimization system 148 is operable to execute this traversal using graph traversal engine 316. Graph traversal engine 316 receives the standardized query object and optionally maps it to one or more anchor nodes within the graph structure datastore 252. Anchor node identification may rely on historical interaction data, explicit references, or direct semantic matches between the query and segment metadata.

Graph traversal engine 316 is operable to execute one or more traversal strategies to identify related segments, including but not limited to breadth-first search (BFS), depth-first search (DFS), or weighted shortest path computations. In some embodiments, traversal may be constrained by relationship type (e.g., citation, dependency, topic similarity), edge directionality, or maximum traversal depth to ensure contextual relevance and computational efficiency.

Each identified segment is returned along with path metadata that may include the number of hops from the anchor, the cumulative edge weight, or the specific relationship types traversed. For example, if a query pertains to a regulatory clause, traversal logic may prioritize downstream segments that have been historically or semantically associated with explanatory content, commentary, or linked precedents.

In some implementations, graph traversal engine 316 supports dynamic traversal path customization based on query attributes or user-configured schema constraints. For instance, a query targeting hierarchical relationships may restrict traversal to parent-child or ancestor-descendant edge types, thereby surfacing only those segments aligned with expected structural patterns.

The resulting contextually connected segments serve as a second retrieval path, which is cross-referenced against semantically similar segments retrieved in step 412. This dual-path retrieval framework ensures that both semantic meaning and contextual integrity are considered during content segment resolution.

In step 416, the system cross-references segments retrieved from the vector index and the graph structure to identify overlapping or corroborating content segments. This operation reconciles the outputs of the two independent retrieval paths—semantic similarity and contextual relationship—by determining which content segments are supported by both forms of evidence.

In certain embodiments, adaptive query execution and optimization system 148 is operable to perform this reconciliation using constraint resolution engine 318. Constraint resolution engine 318 is operable to ingest candidate content segments retrieved from vector retrieval engine 314 and graph traversal engine 316, normalize their relevance scores, and identify intersections or partial overlaps across the two result sets.

Constraint resolution engine 318 may compare each segment's unique identifier, metadata lineage, or internal hash signature to detect identity or equivalence between semantically similar and structurally connected segments. In some embodiments, additional heuristics are applied to detect implicit overlaps—such as parent-child relationships in the graph corresponding to a related embedding cluster in the vector space.

For example, if a query about a tax code clause yields one segment via semantic similarity and another via graph traversal, constraint resolution engine 318 may evaluate whether both segments share a document lineage, cite each other, or fall under a shared hierarchical node, thereby strengthening their joint relevance.

The result of this step is a reduced set of candidate segments that are supported by both retrieval modalities, optionally annotated with metadata that indicates how the dual-path convergence was achieved (e.g., direct match, partial lineage, inferred relation). This enables the subsequent scoring step to leverage both semantic and structural dimensions, improving the reliability and context integrity of final rankings.

In step 418, the system adjusts relevance scores of candidate content segments based on validation signals derived from the structured relationship graph. This step refines the preliminary semantic rankings by incorporating contextual evidence from graph traversal, thereby aligning final relevance scores with both the semantic intent of the query and the logical structure of the indexed knowledge graph.

In certain embodiments, adaptive query execution and optimization system 148 is operable to perform this adjustment using constraint resolution engine 318 in coordination with unified ranking engine 320. Constraint resolution engine 318 provides segment-specific indicators such as traversal depth, edge type conformity, or graph proximity to key nodes, which are input into the unified ranking engine 320 to weight or re-score semantically matched content segments.

Unified ranking engine 320 is operable to apply scoring adjustments based on a configurable set of weighting rules. These may include additive boosts for segments directly connected to a graph node referenced by the query, penalty coefficients for segments with low graph confidence, or normalization of scores to align differing scales between the vector and graph retrieval paths.

For example, a segment retrieved via high semantic similarity but weakly supported in the relationship graph may have its score slightly downgraded, whereas a moderately similar segment that is centrally connected in the relationship graph may be promoted. In certain embodiments, edge weights, node centrality, or relationship types (e.g., explanatory, referential, co-occurrence) are explicitly factored into the scoring model.

This validation-driven score adjustment ensures that final rankings reflect a convergence of semantic meaning and contextual structure, improving both interpretability and accuracy of content retrieval. The adjusted scores are passed forward to unified ranking engine 320 for generation of the final ranked result set.

In step 420, the system generates a unified ranking of validated content segments based on the adjusted relevance scores derived from both the semantic retrieval path and the graph-based validation path. This ranking consolidates evidence from parallel retrieval operations to produce an ordered list of content segments most relevant to the input query, considering both semantic similarity and contextual structure.

In certain embodiments, adaptive query execution and optimization system 148 is operable to generate the unified ranking using unified ranking engine 320. Unified ranking engine 320 receives input from vector retrieval engine 314, graph traversal engine 316, and constraint resolution engine 318. Each input provides a ranked list or scoring vector, which is then normalized and fused using configurable combination logic. For example, a weighted sum or hybrid scoring function may be used, where semantic and structural components are combined according to system-configured or query-specific weight distributions.

Unified ranking engine 320 may also incorporate tie-breaking logic when two or more segments receive equivalent composite scores. Tie-breaking may be resolved using secondary criteria such as recency of content segment, frequency of prior user selections, metadata conformity, or relative position within the source document. In certain embodiments, the system applies diversity constraints to prevent ranking clusters of content segments that are overly similar or derived from the same source document unless explicitly reinforced by graph structure.

The resulting ranked list reflects the highest-confidence matches that satisfy both semantic and structural constraints, and is used to guide the presentation, post-processing, or further interpretation of results. In certain implementations, this ranking step supports deterministic query output, auditability of score composition, and compliance with workflow-specific ranking requirements.

In step 422, the system provides the ranked content segments for presentation to a user or for further processing by one or more connected systems. The final ranked list reflects content segments that have been validated by both semantic similarity and structured relationship alignment, ensuring the returned results satisfy both lexical and contextual relevance requirements.

In certain embodiments, adaptive query execution and optimization system 148 is operable to output the ranked content segments using response synthesis pipeline 322. Response synthesis pipeline 322 receives the unified ranking from unified ranking engine 320 and formats the results according to the presentation protocol or consumption requirements of the requesting interface. Formatting may include converting ranked segments into structured JSON, annotated HTML, or other serialized formats, embedding score metadata, source attribution, and structural lineage for each content segment.

Response synthesis pipeline 322 may further apply user-specific presentation filters, such as content length constraints, entity highlighting, or ranking truncation based on configured display limits. In some embodiments, segments are grouped by document class, source, or relationship cluster to enhance navigability. Where presentation is not required, the ranked segments may be routed for integration into analytics dashboards, compliance review queues, or machine-readable pipelines that perform rule-based or model-driven post-processing.

In implementations involving user interaction, the formatted response may be transmitted to user device(s) 155, where interactive elements allow the user to explore segment context, trace inter-segment relationships, or provide feedback on result relevance. This feedback may be collected and processed by feedback incorporation module 324, completing a closed-loop system that continuously refines performance across subsequent query sessions.

Figure 5:
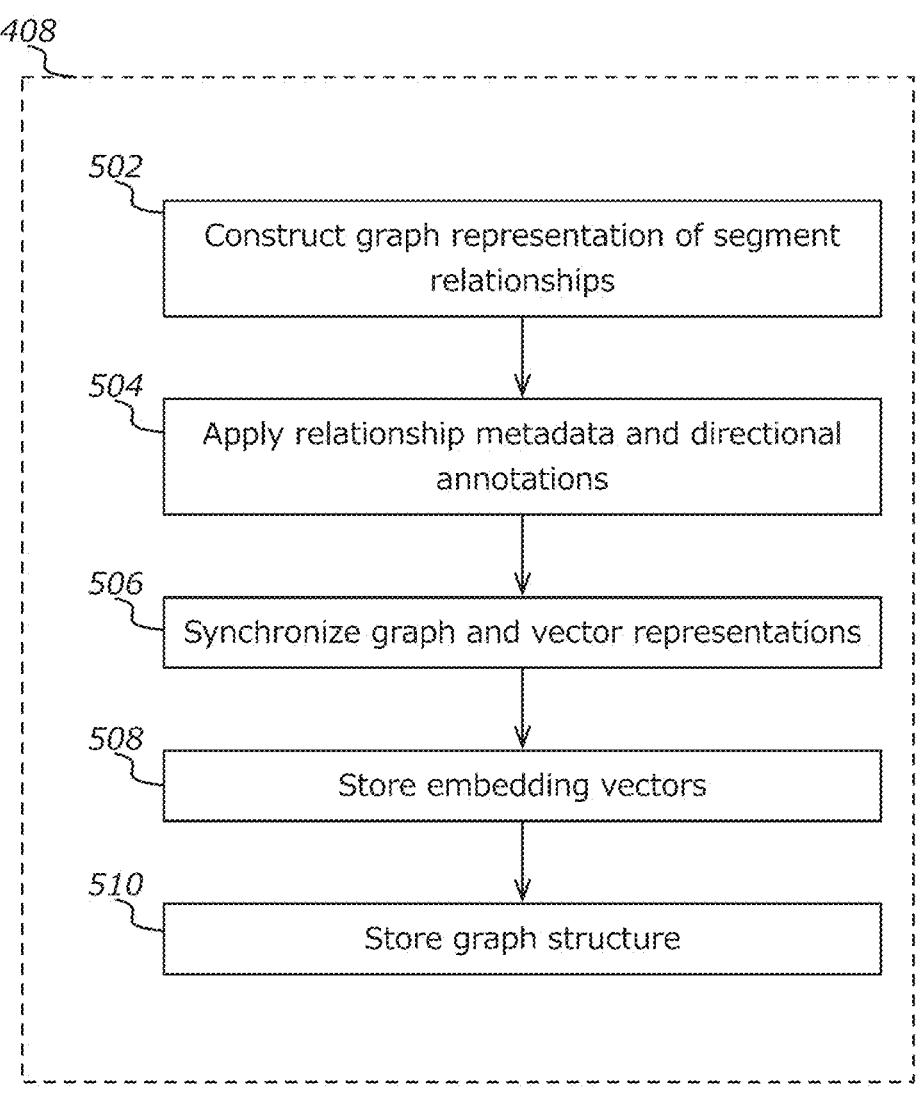
FIG. 5 illustrates an example process for generating and synchronizing dual-path index structures in accordance with various embodiments.

FIG. 5 illustrates an exemplary process flow for maintaining vector embeddings and structured relationships in parallel index structures, in accordance with various embodiments. The steps shown represent operations performed by one or more components of the system, including document ingestion and preprocessing system 140 and data processing and transformation system 142, as described in FIG. 1 and FIG. 2. The process may include additional steps, fewer steps, or steps executed in a different order without departing from the scope of the invention, as would be apparent to one of ordinary skill in the art.

In step 502, graph representations of content segment relationships are constructed. Each node in the graph corresponds to an individual content segment, and edges denote the presence of a logical, structural, or semantic relationship between segments. Graph construction incorporates multiple relationship types, including explicit citations (e.g., one segment referencing another via hyperlink or citation string), implicit semantic proximity (e.g., segments sharing a common inferred topic or contextual anchor), and hierarchical containment (e.g., section/subsection nesting within a document structure). In certain embodiments, relationship extraction module 234 is operable to generate candidate edge pairs by analyzing content segment metadata, document layout cues, and semantic coherence scores derived from embedding proximity.

More specifically, relationship extraction module 234 may apply rule-based heuristics to detect structural links—such as numbered headings, bullet hierarchies, or reference tags—and compute similarity thresholds using cosine distance between embedding vectors to infer semantic connections. The module may further consider positional context, document type schemas, and user-defined linkage rules when determining whether to instantiate an edge between nodes. Relationship types may be assigned a categorical label (e.g., "citation," "containment," or "semantic proximity") and associated with confidence scores reflecting edge reliability. These labeled relationships form the basis for a dynamic, traversable graph that encodes contextual structure across the content corpus.

In certain embodiments, graph construction may occur incrementally as new content segments are ingested, or may be periodically recomputed during batch operations. Edge deduplication and consistency verification may be performed before finalization. Graph construction output is passed to relationship annotation module 238 for further processing in step 504.

In step 504, relationship metadata and directional annotations are applied to the graph structure constructed in step 502. Each edge between content segments is enriched with metadata attributes that characterize the nature, strength, and directionality of the connection. This includes, for example, the relationship type (e.g., "cites," "parent_of," "refers_to"), a confidence score derived from the relationship extraction process, timestamps indicating when the relationship was established or last validated, and optional source provenance identifiers.

In certain embodiments, relationship annotation module 238 is operable to apply these metadata attributes by referencing both the output of relationship extraction module 234 and configurable schema rules associated with the content domain. For instance, hierarchical containment relationships may be assigned top-down directionality (e.g., from a section heading to a paragraph node), while cross-document citations may be annotated with bidirectional flags or weighted asymmetry based on citation density or semantic alignment.

The relationship annotation module 238 may also encode traversal hints—such as edge priority values or pruning conditions—to assist later stages of graph traversal and constraint resolution. In some implementations, the annotations are represented as structured key-value pairs within the edge object, and may be stored using a graph-native serialization format (e.g., property graphs, RDF triples, or custom JSON-based schemas).

Once annotated, the graph structure becomes a semantically enriched knowledge graph operable for constraint-based filtering, validation checks, and traversal workflows. These enriched edges serve as a foundational structure for synchronized indexing and retrieval coordination, as described in the following steps.

In step 506, the system synchronizes the graph and vector representations to ensure that the semantic embeddings and structured relationship data reflect a coherent and mutually consistent state. Synchronization includes confirming that each node in the graph corresponds to a vector in the embedding index and that updates to segment relationships or embeddings are propagated across both data structures.

In certain embodiments, index synchronization manager 240 is operable to perform this synchronization by maintaining bidirectional mappings between content segment identifiers and their associated vector embeddings and graph nodes. When a segment is updated—such as through a re-parsing event or metadata change—the index synchronization manager 240 ensures that the corresponding embedding is refreshed, and that graph edges referencing the segment are reevaluated for validity.

The synchronization process may include conflict detection and reconciliation logic. For example, if a segment is split or merged during re-indexing, the system may generate new vector embeddings and restructure the affected subgraph to preserve relationship fidelity. Synchronization metadata, such as update timestamps and revision hashes, may also be maintained to track the lineage and consistency of each segment across the two indexing modes.

In certain implementations, synchronization events are logged to a change management queue, allowing data validation and integrity system 144 to perform consistency checks and emit reconciliation signals if desynchronization thresholds are exceeded. This ensures that semantic search and structured constraint resolution operate over aligned data representations, preserving retrieval reliability and interpretability.

In step 508, the system stores the generated embedding vectors in a retrievable, indexable data structure for use in similarity-based retrieval operations. Each embedding vector corresponds to a semantically encoded representation of a content segment, allowing subsequent queries to perform vector-based comparison and retrieval.

In certain embodiments, vector index datastore 250 is operable to persist these embeddings using a format optimized for high-dimensional similarity search, such as approximate nearest neighbor (ANN) indexing. Supported formats may include locality-sensitive hashing (LSH), product quantization (PQ), or HNSW-based graph structures, depending on the desired tradeoff between recall, speed, and storage cost.

Each vector entry stored in vector index datastore 250 is associated with a unique segment identifier, position metadata, and optional versioning attributes. This enables the system to track which version of a segment is represented by the stored vector and facilitates rollback or incremental updates during re-indexing operations. The embedding vectors may be stored in floating-point or quantized representations depending on system constraints.

In certain implementations, index synchronization manager 240 coordinates vector storage events with graph updates to maintain alignment across dual-path retrieval components. This ensures that vector index datastore 250 reflects the current embedding state of all active segments and supports efficient lookups during real-time or batched query execution.

In step 510, the system stores the constructed graph structure representing inter-segment relationships in a persistent, traversable graph datastore. This graph encodes structured knowledge constraints derived from extracted relationships among content segments, enabling the system to perform graph-based traversal during query resolution.

In certain embodiments, graph structure datastore 252 is operable to maintain the graph as a directed multigraph, where each node corresponds to a content segment and each edge encodes a specific relationship type, directionality, and optional confidence score. Edge types may include parent-child relationships, cross-references, co-occurrence patterns, or inferred semantic links, each annotated with metadata to guide constraint resolution and traversal logic.

Graph structure datastore 252 may be implemented using a native graph database (e.g., Neo4j, JanusGraph) or a custom in-memory representation depending on scale and latency requirements. Each graph update is versioned and timestamped to support rollback, incremental updates, and validation traceability.

In certain implementations, index synchronization manager 240 coordinates updates to graph structure datastore 252 with vector index datastore 250 to ensure alignment across dual-path retrieval mechanisms. Synchronization protocols may include transactional locking, commit queues, or event-driven notifications to propagate changes and invalidate stale retrieval caches.

Figure 6:
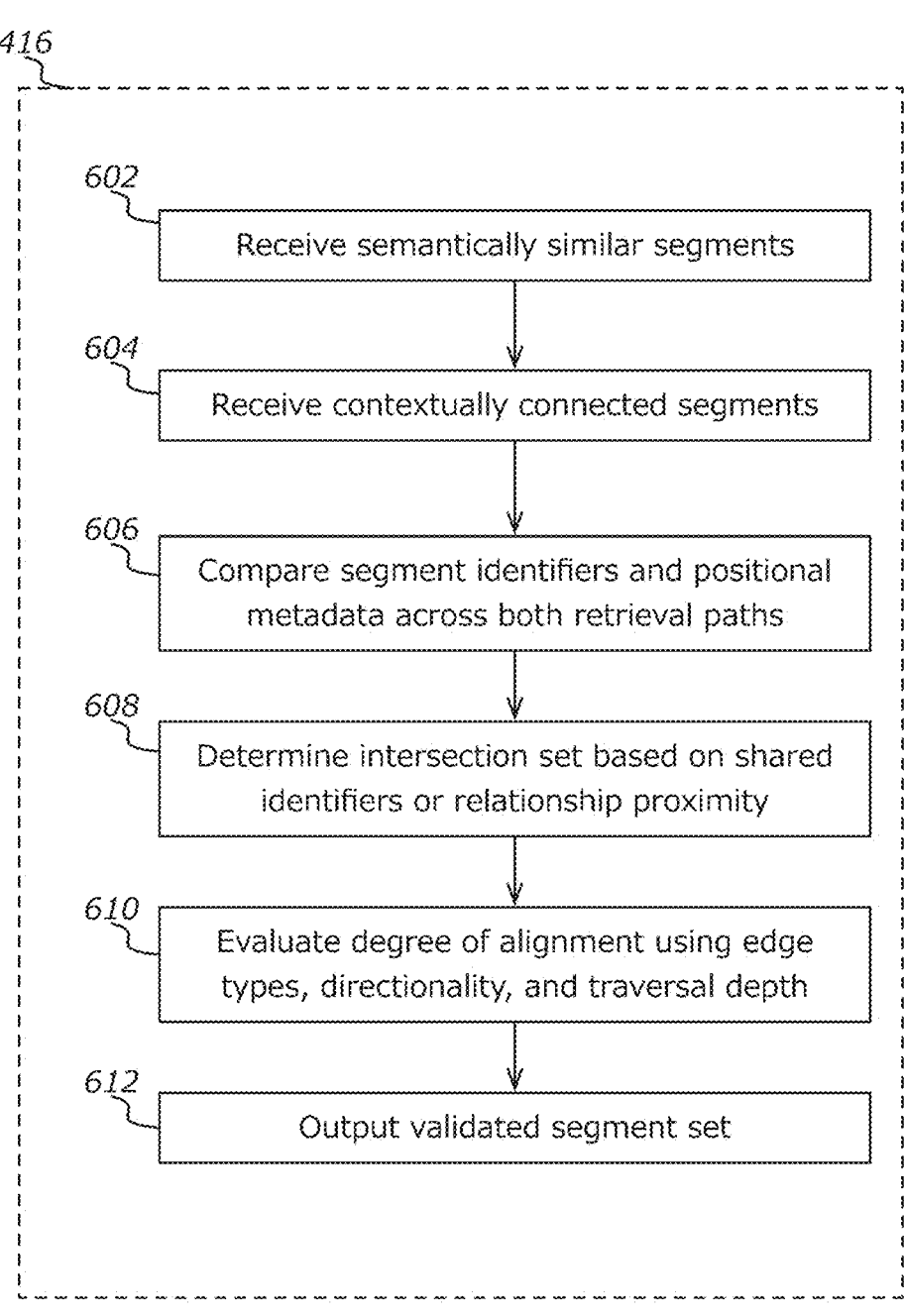
FIG. 6 illustrates an example process for validating retrieval path intersections using structural alignment in accordance with various embodiments.

FIG. 6 illustrates an exemplary process flow for cross-referencing retrieval paths and applying constraint resolution logic to generate a unified content ranking, in accordance with various embodiments. The steps shown represent operations performed by one or more components of the system, including adaptive query execution and optimization system 148 and its subcomponents as described in FIG. 3. The process may include additional steps, fewer steps, or steps executed in a different order without departing from the scope of the invention, as would be apparent to one of ordinary skill in the art.

In step 602, semantically similar segments are received. These segments represent portions of content that exhibit vector-space similarity to the query, based on embeddings generated during prior indexing operations. The semantically similar segments may originate from multiple documents and may vary in format, including natural language text, markup-encoded passages, or structured metadata blocks. Each segment in this set is associated with a similarity score reflecting the degree of match to the input query in the vector embedding space.

In certain embodiments, vector retrieval engine 314 is operable to execute similarity search queries against the vector index datastore 250 using cosine distance, dot product scoring, or approximate nearest neighbor algorithms (e.g., HNSW or FAISS-based implementations). The input query may be tokenized and embedded using the same model used for content segments during ingestion. Retrieved segments are scored, ranked, and returned with associated segment identifiers and vector metadata. Segment metadata may include embedding version, document origin, position indicators, and historical access patterns.

In some configurations, retrieval may apply contextual filters based on user attributes, prior queries, or domain-specific query augmentation. For example, in a compliance use case, the system may restrict results to a particular regulatory schema or document type. In another example, retrieval engine 314 may incorporate temporal decay to deprioritize older segments unless explicitly favored by query context. Retrieved segment sets are staged for cross-referencing in subsequent validation stages.

In step 604, contextually connected segments are received. These segments are identified based on structured relationships defined within the graph structure datastore 252, representing logical, semantic, or referential connections between content segments. Unlike semantically similar segments retrieved through vector-space proximity, contextually connected segments are derived from explicit or inferred structural relationships across documents, sections, or entity-linked content groupings.

In certain embodiments, graph traversal engine 316 is operable to perform directed or undirected traversals of the graph structure datastore 252 beginning from one or more seed nodes relevant to the input query. Seed nodes may correspond to entities or segments inferred from prior query history, predefined schema anchors, or structural cues present in the query itself. Traversal paths may include direct citations, parent-child section hierarchies, version lineage links, or normalized references to shared document concepts. Each traversed segment is evaluated based on traversal depth, edge type, and traversal rules configured for the domain.

In some implementations, traversal engine 316 may apply relationship filters or expansion limits to constrain the scope of connected segments. For example, in a financial documentation scenario, the engine may restrict traversal to intra-policy connections or avoid transitive expansion across separate document classes. Retrieved contextually connected segments are packaged with traversal metadata, including originating edge types, path scores, and traversal origin markers, and are staged for comparison and validation against semantically similar results in subsequent processing steps.

In step 606, segment identifiers and positional metadata are compared across both retrieval paths. This comparison establishes a preliminary correspondence between semantically similar segments retrieved from the vector index and contextually connected segments retrieved via graph traversal. Each segment from both sets is represented by a unique segment identifier, which may be composed of a document-specific prefix, segment index, and hierarchical path indicators, along with metadata such as source document ID, page or section number, and logical position within the originating content.

In certain embodiments, constraint resolution engine 318 is operable to perform this comparison by evaluating segment identifiers for direct matches and assessing alignment in positional metadata. For example, segments may be aligned if they originate from the same source document and occupy overlapping structural positions (e.g., the same section number or neighboring paragraphs). The comparison process may tolerate minor identifier discrepancies using prefix normalization or hierarchical folding logic to detect proximity-based relationships even when identifiers differ slightly due to formatting or ingestion variations.

In some implementations, the comparison includes evaluation of lineage metadata and class identifiers. For instance, segments from different document versions may be aligned using document class metadata and version tracking fields, enabling continuity across evolving source materials. This comparison stage produces a mapping of candidate segment pairs or clusters that exhibit potential correspondence, forming the basis for constraint-based validation and final scoring in later steps.

In step 608, an intersection set is determined based on shared identifiers or relationship proximity between segments retrieved from both semantic and structural retrieval paths. The intersection set represents content segments that are either explicitly matched across retrieval outputs or exhibit sufficient relational closeness to warrant consolidation for validation and scoring.

In certain embodiments, constraint resolution engine 318 is operable to evaluate the candidate mappings from step 606 and apply one or more inclusion criteria to determine segment alignment. Direct matches are included when a content segment appears in both retrieval sets with identical segment identifiers. Proximity-based matches may also be included when segments are not exact matches but share a parent-child, sibling, or reference-linked relationship within the graph structure, as determined via traversal depth constraints or annotated edge types. For example, a semantically similar segment may be included in the intersection set if it is directly referenced by or adjacent to a structurally retrieved segment within a threshold of N graph hops.

In some implementations, inclusion rules may be defined by schema-specific knowledge models or adaptive weighting thresholds. The intersection determination may incorporate document lineage data, segment confidence scores, and historical co-occurrence metrics derived from prior queries or annotated training sets. The resulting intersection set serves as the constrained candidate pool for further evaluation and final ranking.

In step 610, the degree of alignment between segments in the intersection set is evaluated using edge types, directionality, and traversal depth. This step measures the structural coherence and contextual strength of each candidate segment relative to the originating query and the corresponding retrieval paths.

In certain embodiments, constraint resolution engine 318 is operable to retrieve annotated edge attributes from graph structure datastore 252, including edge type (e.g., citation, reference, co-occurrence), directionality (e.g., parent-to-child or reverse), and edge weight (e.g., frequency or confidence). The engine may calculate a cumulative alignment score for each segment based on the number and types of edges connecting it to other validated segments, with directional consistency and shorter traversal paths contributing higher scores.

For example, a segment directly cited by a structurally retrieved node with a "reference" edge and one-hop distance may receive a higher alignment score than a segment connected via a generic "related" edge across three hops. In certain implementations, schema-aware traversal rules may prioritize certain edge types (e.g., parent-child over sibling) or limit allowable traversal depth based on query intent or user-configured constraints.

Alignment scoring may also incorporate historical interaction signals—such as user selections or rejection patterns—from user interaction datastore 330 to reweigh traversal relevance dynamically. The resulting alignment scores are used to refine and constrain the final output set before unified ranking and response generation.

In step 612, a validated segment set is output based on alignment analysis across the dual retrieval paths. The validated segment set comprises content segments that satisfy both semantic similarity thresholds and structural relationship constraints derived from prior comparison and alignment stages.

In certain embodiments, constraint resolution engine 318 is operable to compile the validated segment set by filtering candidate segments that meet minimum alignment scores, structural consistency criteria, and query relevance thresholds. This filtering may apply exclusion rules for segments with low traversal confidence or conflicting directional paths and may enforce schema-specific validation gates depending on the domain or document class.

For example, in a regulatory interpretation context, segments lacking confirmable back-links to authoritative clauses or parent segments may be excluded, even if semantically similar. The resulting set is compiled as a structured data object that preserves segment identifiers, confidence scores, structural lineage metadata, and provenance tags for each validated segment.

Validated segment sets are stored transiently within memory structures managed by adaptive query execution and optimization system 148, and passed to unified ranking engine 320 for prioritized ordering and eventual response generation. In certain implementations, the validated segment set may be persisted in query response history datastore 332 for future reference, audit logging, or iterative feedback processing.

Figure 7:
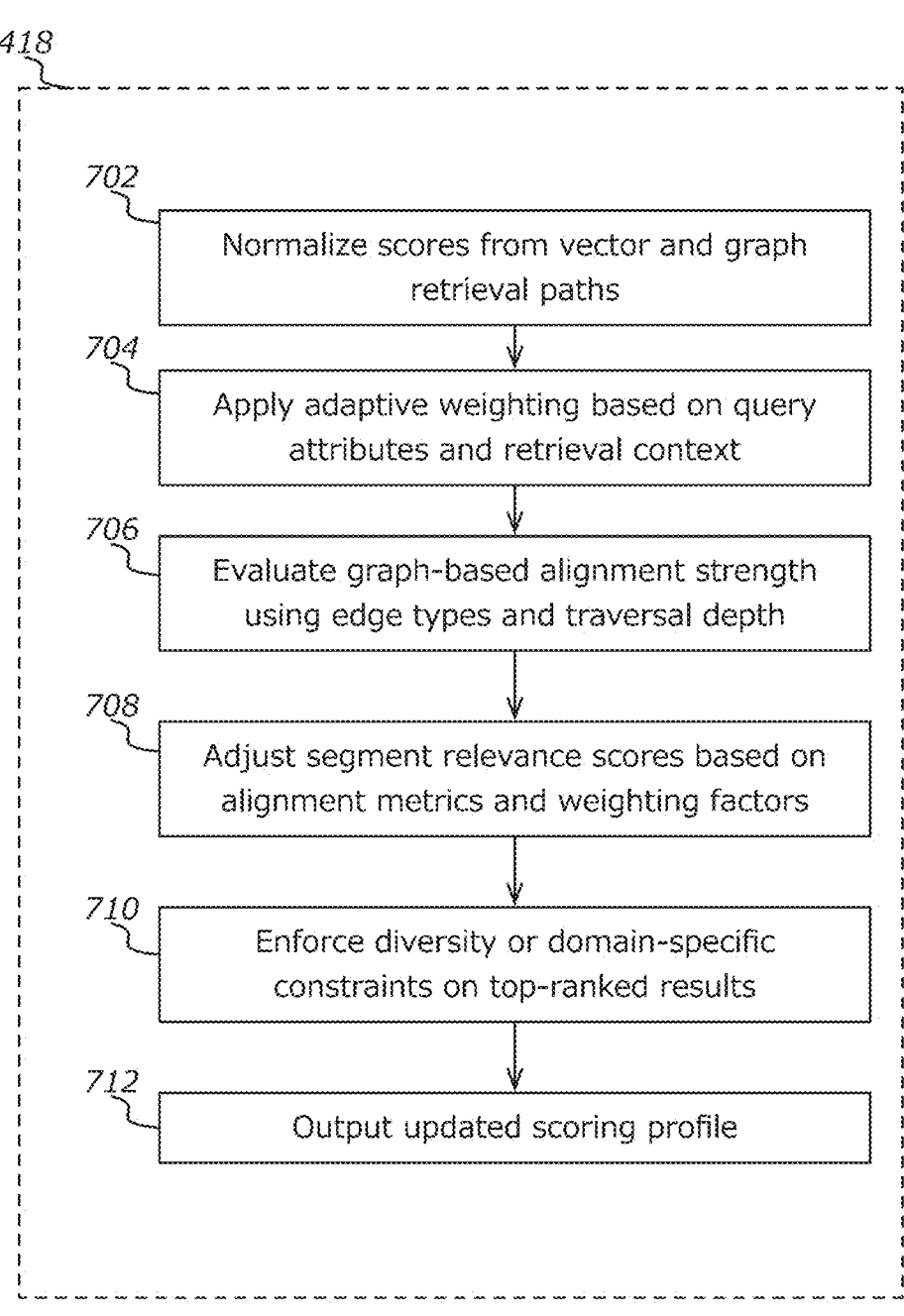
FIG. 7 illustrates an example process for adjusting segment relevance scores using constraint resolution techniques in accordance with various embodiments.

FIG. 7 illustrates an exemplary process flow for adaptive relevance scoring based on constraint-based validation, in accordance with various embodiments. The steps shown represent operations performed by components of the system, including constraint resolution engine 318, graph traversal engine 316, and feedback incorporation module 324, as described in FIG. 3. The process may include additional steps, fewer steps, or steps executed in a different order without departing from the scope of the invention, as would be apparent to one of ordinary skill in the art.

In step 702, scores derived independently from the vector retrieval path and the graph traversal path are normalized to a common scale. Each retrieval path may output relevance or similarity scores based on distinct computational models—e.g., cosine similarity for vector-based retrieval and traversal confidence or edge-weight accumulation for graph-based retrieval. These scores must be aligned onto a comparable scale to support coordinated ranking.

In certain embodiments, constraint resolution engine 318 is operable to perform the score normalization process. The normalization may apply min-max scaling, Z-score transformation, or quantile mapping based on the observed distributions of retrieval scores across both paths. For example, if the vector scores are distributed within a 0.7-0.95 range while the graph scores are within 0.1-0.6, the system may rescale both to a 0-1 interval using percentile anchors or empirical cumulative distribution functions (eCDFs). Normalization ensures that neither retrieval path disproportionately influences the combined relevance computation due to scale bias.

In some implementations, normalization parameters may be dynamically adjusted based on query context, retrieval volume, or prior session statistics. For instance, queries involving shorter input vectors or sparse graph neighborhoods may trigger alternate scaling heuristics that account for lower signal confidence. The normalized scores for each segment are retained as intermediate values for use in subsequent reweighting and alignment operations.

In step 704, adaptive weighting is applied to the normalized scores from the vector and graph retrieval paths based on query attributes and retrieval context. This weighting mechanism adjusts the relative influence of each retrieval path on the final ranking calculation by evaluating query-specific features and environmental context signals.

In certain embodiments, constraint resolution engine 318 is operable to apply these adaptive weights. Query attributes may include query length, linguistic complexity, embedding confidence scores, or known domain-specific indicators. For example, a short keyword query may receive higher weighting toward graph-based retrieval due to limited semantic richness, whereas a well-formed paragraph query may favor vector similarity due to richer context captured in the embedding. Retrieval context may also include system-level signals such as recent feedback trends, corpus density near the query vector, or expected segment connectivity within the graph.

In various implementations, the adaptive weights may be computed using rule-based heuristics, model-driven estimators, or hybrid scoring functions. For instance, a context classifier may assign a weight of 0.65 to vector-based retrieval and 0.35 to graph-based traversal for a particular query session. These weights are applied to the normalized scores of each segment to compute a composite score used in later filtering and ranking stages. The weighting logic can be periodically updated based on session-level analytics and continuous feedback integration.

In step 706, the system evaluates the alignment strength of content segments retrieved via graph traversal by analyzing edge types, directional relationships, and traversal depth between nodes. This operation determines whether semantically retrieved segments are contextually valid and structurally coherent according to graph-encoded knowledge.

In certain embodiments, constraint resolution engine 318 is operable to perform this evaluation. For each candidate segment retrieved from the graph structure datastore 252, the system inspects the path connecting it to the original query segment or anchor nodes. Evaluation parameters may include edge type (e.g., citation, co-reference, hierarchical dependency), edge directionality (e.g., forward, backward), and traversal depth (i.e., number of edges traversed to reach the segment). For example, a directly referenced segment connected by a forward "supports" edge may receive higher alignment strength than a segment reachable only through three hops via neutral associations.

In some implementations, different edge types are assigned configurable weights based on their semantic strength or domain relevance. The system may apply decay functions based on traversal depth to reduce influence from distant nodes. A weighted alignment score is then calculated for each segment, representing its graph-based coherence relative to the query segment and its immediate structural neighborhood. These scores are retained for subsequent composite scoring and ranking processes.

In step 708, segment relevance scores are adjusted based on the graph-based alignment metrics and query-specific weighting factors computed during prior steps. This step combines semantic similarity measures with structural coherence indicators to generate a composite relevance profile for each candidate content segment.

In certain embodiments, constraint resolution engine 318 is operable to apply score adjustment logic that incorporates alignment scores generated in step 706, weighting coefficients derived from query context in step 704, and normalization values from step 702. For example, the system may apply a weighted sum or confidence-based re-ranking approach where the final score of a segment is calculated as:

$$FinalScore = \alpha * SemanticScore + \beta * GraphAlignmentScore$$

where $\alpha$ and $\beta$ are adaptive weights dynamically computed based on query length, type, and prior user interaction signals.

In some implementations, the system may include fallback logic that increases semantic score weight when structural alignment is weak or missing, or penalizes segments with alignment paths exceeding a traversal depth threshold. In certain embodiments, score adjustments may also be conditioned on edge type priority or graph density around the candidate node. The resulting score vector reflects the system's integrated assessment of semantic relevance and structural validity, forming the basis for final ranking.

In step 710, diversity rules and domain-specific constraints are applied to the adjusted segment scores to filter or re-rank the top results before final output. This step ensures that the validated result set reflects a meaningful breadth of content while conforming to expected domain characteristics or schema-aligned retrieval expectations.

In certain embodiments, constraint resolution engine 318 is operable to enforce inter-segment diversity by limiting the number of segments retrieved from a single source document or hierarchical branch within the relationship graph. For example, when multiple high-scoring segments originate from the same document or are structurally adjacent (e.g., parent-child or sibling nodes), the system may apply a suppression factor or ranking decay function to deprioritize closely clustered results.

In other implementations, domain-specific constraints may be enforced based on content schema, relationship annotations, or contextual markers. For instance, a query targeting policy obligations may trigger constraints requiring at least one result from each of multiple regulatory sections or document classes. In certain embodiments, segment eligibility may be filtered based on minimum alignment thresholds, required edge types, or excluded relationship paths defined in the query profile.

The resulting filtered and adjusted segment set preserves ranking integrity while ensuring a diverse and domain-consistent result set. This step may also log constraint decisions for later analysis or user feedback integration.

In step 712, the system outputs an updated scoring profile reflecting the final relevance scores, alignment metrics, and applied constraint adjustments for each validated segment. This scoring profile represents the completed resolution output of the relevance evaluation and prioritization process.

In certain embodiments, unified ranking engine 320 is operable to generate a structured scoring output that includes, for each segment, its semantic similarity score, graph-based alignment score, weighted composite relevance score, and any metadata flags indicating constraint adjustments or diversity enforcement. These values may be encoded as key-value structures, numerical vectors, or annotated segment records depending on system configuration and integration requirements.

The scoring profile may be passed to response synthesis pipeline 322 for presentation formatting or additional response generation logic. In some implementations, the scoring profile is also recorded to query response history datastore 332 to support future optimization, auditability, or feedback-driven refinement processes. The scoring profile may be exported in structured formats such as JSON, XML, or CSV to enable compatibility with external analytics or content delivery systems.

The disclosure also provides support for What is claimed is: 1. a computer-implemented method for augmenting semantic search with structured knowledge constraints, comprising: receiving a plurality of content segments, individual content segments representing at least one source document, processing the plurality of content segments through a dual-indexing pipeline to generate a vector embedding for each content segment, extracting structured relationships between the plurality of content segments, maintaining parallel data structures, based on generated vector embeddings and extracted structured relationships, the parallel data structures comprising a vector index that stores the generated vector embeddings for similarity-based retrieval and a graph structure that stores the extracted structured relationships as traversable connections used to impose structured knowledge constraints on semantic retrieval, receiving a query to augment a semantic search, initiating a first retrieval path to search the vector index to identify semantically similar segments, initiating a second retrieval path to traverse the graph structure to identify contextually connected segments, wherein the first retrieval path and the second retrieval path are parallel retrieval paths, executing a constraint resolution process comprising: cross-referencing the semantically similar segments identified by the first retrieval path against the contextually connected segments identified by the second retrieval path, adjusting relevance scores for the semantically similar segments based at least in part on presence or absence of corresponding graph connections, and generating a unified ranking that prioritizes content segments validated by both the first retrieval path and the second retrieval path, wherein the constraint resolution process filters the semantically similar segments identified by the first retrieval path through the graph structure to apply structured knowledge constraints. In a first example of the method, processing the plurality of content segments through the dual-indexing pipeline comprises: parsing at least one source document to extract the plurality of content segments, generating vector embeddings by encoding each content segment through a neural language model, identifying structured relationships between the content segments by detecting at least one of reference patterns, contextual indicators, or semantic dependencies, and creating bidirectional links that capture at least one of relationship type, strength, or contextual metadata. In a second example of the method, optionally including the first example, the method further comprises: an automated query construction mechanism that: monitors user interactions with one or more displayed content segments, captures a selected content segment and an interaction context, generates a constructed query by combining the selected content segment with one or more contextual prefixes and one or more hidden instruction parameters, and routes the constructed query through the parallel retrieval paths without requiring manual query formulation. In a third example of the method, optionally including one or both of the first and second examples, the one or more hidden instruction parameters comprise: retrieval constraints that limit search scope based on the interaction context, formatting directives that structure a response according to predefined templates, and personalization filters that adjust response complexity based on one or more stored user attributes. In a fourth example of the method, optionally including one or more or each of the first through third examples, the automated query construction mechanism further comprises: detecting one or more interaction types from one or more user interface events, selecting one or more query templates matched to an interaction type, extracting one or more context windows associated with the selected content segment, and injecting interaction-specific parameters into the constructed query. In a fifth example of the method, optionally including one or more or each of the first through fourth examples, traversing the graph structure comprises: identifying entry nodes in the graph structure that match one or more query terms, traversing connections from the entry nodes to other nodes in the graph structure based on edge weights and relationship types, accumulating traversal scores at each visited node, and selecting content segments corresponding to nodes having a highest accumulated traversal scores. In a sixth example of the method, optionally including one or more or each of the first through fifth examples, the constraint resolution process comprises: creating a connectivity matrix between the semantically similar segments identified by the first retrieval path and the contextually connected segments identified by the second retrieval path, calculating a validation score for each semantically similar segment based on a number of connections and edge weights representing relationship strength in the connectivity matrix, applying a decay function to a similarity score for each semantically similar segment, the decay function being inversely proportional to a corresponding validation score, and re-ranking the semantically similar segments using adjusted similarity scores. In a seventh example of the method, optionally including one or more or each of the first through sixth examples, the method further comprises: a response synthesis pipeline that: retrieves at least a portion of a source document corresponding to each content segment prioritized by the unified ranking, extracts relationship paths between the content segments from the graph structure, assembles a context package containing the content segments and their relationships, processes the context package through a language model to generate a coherent response, and annotates the coherent response with source references linked to specific content segments. In a eighth example of the method, optionally including one or more or each of the first through seventh examples, the graph structure stores structured relationships, each structured relationship comprising multiple attribute dimensions including: a relationship category that defines a type of connection, a directional indicator that specifies a direction of a structured relationship between content segments, a strength metric that quantifies connection relevance, and a contextual annotation that describes a contextual aspect of the structured relationship. In a ninth example of the method, optionally including one or more or each of the first through eighth examples, the method further comprises: a caching layer that: stores results of graph traversals previously executed for prior queries, maintains pre-computed paths between nodes in the graph structure that are accessed in response to queries matching a previously received query, caches unified rankings for queries matching the previously received query, and invalidates cached entries in response to updates to the graph structure. In a tenth example of the method, optionally including one or more or each of the first through ninth examples, maintaining parallel data structures comprises: synchronizing updates between the vector index and the graph structure upon receipt of at least one additional content segment processed through the dual-indexing pipeline, propagating at least one deletion across the vector index and the graph structure to maintain structural and referential consistency, re-indexing the vector index in response to one or more modifications that exceed a defined threshold condition, and performing validation at predetermined intervals to verify alignment between the vector index and the graph structure. In a eleventh example of the method, optionally including one or more or each of the first through tenth examples, the method further comprises: a multi-service orchestration layer that: distributes processing of the query across a plurality of service endpoints, coordinates at least one search operation on the vector index using dedicated vector-processing hardware, routes traversal of the graph structure to graph-optimized processors, aggregates one or more results produced by the plurality of service endpoints executing the parallel retrieval paths, detects one or more service execution failures associated with the plurality of service endpoints, and invokes one or more fallback mechanisms in response to the one or more service execution failures. In a twelfth example of the method, optionally including one or more or each of the first through eleventh examples, the extracted structured relationships comprise: explicit references, individual explicit references indicating that a first content segment directly cites a second content segment, implicit connections between content segments, individual implicit connections identified based on semantic analysis, hierarchical relationships that define parent-child relationships between content segments, and cross-references that link content segments associated with different source documents. In a thirteenth example of the method, optionally including one or more or each of the first through twelfth examples, the method further comprises: a state management system that: tracks a plurality of query and response pairs, each query and response pair associated with a unique identifier, stores one or more interaction contexts associated with the plurality of query and response pairs to maintain session continuity, enables retrieval of a specific query and response pair based on the unique identifier associated with the specific query and response pair, and maintains one or more annotation layers associated with the specific query and response pair. In a fourteenth example of the method, optionally including one or more or each of the first through thirteenth examples, generating the unified ranking comprises: normalizing the relevance scores associated with the semantically similar segments and the contextually connected segments to a shared numerical range, applying a weighted combination of normalized relevance scores, wherein one or more weights are selected based at least in part on one or more characteristics of the query, applying one or more tic-breaking rules in response to two or more content segments having equivalent weighted relevance scores, and selecting a set of top-ranked content segments that includes a diversity constraint based on one or more content segment attributes. In a fifteenth example of the method, optionally including one or more or each of the first through fourteenth examples, the method further comprises: an incremental update mechanism that: processes one or more new content segments through the dual-indexing pipeline to generate one or more additional vector embeddings and to extract one or more additional structured relationships, identifies one or more potential structured relationships between the one or more new content segments and one or more previously processed content segments, updates the graph structure to incorporate the one or more additional structured relationships, updates the vector index by reindexing one or more portions of a vector space associated with the one or more additional vector embeddings, and invalidates one or more cached entries associated with one or more traversal paths impacted by the graph structure. In a sixteenth example of the method, optionally including one or more or each of the first through fifteenth examples, initiating the first retrieval path and the second retrieval path in parallel comprises executing search operations against the vector index and traversal operations against the graph structure concurrently, and wherein executing the constraint resolution process further comprises: applying one or more filtering operations to the content segments identified by the first retrieval path based on the structured relationships associated with the content segments identified by the second retrieval path, generating the unified ranking based on one or more comparisons of retrieval results produced by the first retrieval path and the second retrieval path, and processing a plurality of queries using the dual-indexing pipeline and the constraint resolution process without requiring modification of data structures maintained across different query types. In a seventeenth example of the method, optionally including one or more or each of the first through sixteenth examples, the method further comprises: a feedback incorporation mechanism that: receives one or more user interaction signals associated with content segments included in the unified ranking, identifies one or more usage patterns based on the one or more user interaction signals, the one or more usage patterns comprising one or more indications of selection or rejection of individual content segments, modifies one or more edge weights associated with one or more structured relationships in the graph structure based on the one or more usage patterns, and adjusts one or more constraint resolution parameters used during execution of the constraint resolution process based on the one or more usage patterns. In a eighteenth example of the method, optionally including one or more or each of the first through seventeenth examples, the vector index and the graph structure are distributed across a plurality of storage nodes, distribution comprising: implementing one or more partitioning strategies that co-locate content segments and corresponding structured relationships within individual storage nodes, replicating the vector index and the graph structure across a subset of the plurality of storage nodes to provide fault tolerance, distributing queries associated with the vector index and the graph structure across the plurality of storage nodes based on one or more load balancing policies, and synchronizing updates to the vector index and the graph structure across the plurality of storage nodes based on one or more consistency protocols.

The disclosure also provides support for a computer system for augmenting semantic search with structured knowledge constraints, comprising: one or more processors, and a non-transitory computer-readable medium storing instructions that, when executed by the one or more processors, cause the computer system to: receive a plurality of content segments, individual content segments representing at least one source document, process the plurality of content segments through a dual-indexing pipeline to generate a vector embedding for each content segment, extract structured relationships between the plurality of content segments, maintain parallel data structures, based on generated vector embeddings and extracted structured relationships, the parallel data structures comprising a vector index that stores the generated vector embeddings for similarity-based retrieval and a graph structure that stores the extracted structured relationships as traversable connections used to impose structured knowledge constraints on semantic retrieval, receive a query to augment a semantic search, initiate a first retrieval path to search the vector index to identify semantically similar segments, initiate a second retrieval path to traverse the graph structure to identify contextually connected segments, wherein the first retrieval path and the second retrieval path are parallel retrieval paths, execute a constraint resolution process comprising: cross-referencing the semantically similar segments identified by the first retrieval path against the contextually connected segments identified by the second retrieval path, adjusting relevance scores for the semantically similar segments based at least in part on presence or absence of corresponding graph connections, and generating a unified ranking that prioritizes content segments validated by both the first retrieval path and the second retrieval path, wherein the constraint resolution process filters the semantically similar segments identified by the first retrieval path through the graph structure to apply structured knowledge constraints.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the systems, modules, engines, interfaces, components, or structures described herein may comprise hardware, software, or a combination thereof. For example, the systems described in connection with document ingestion and preprocessing system 140, data processing and transformation system 142, data validation and integrity system 144, structured data management and output system 146, adaptive query execution and optimization system 148, and their respective subcomponents may include one or more computing devices configured to execute the functionality described throughout the specification. In certain embodiments, these components may be implemented as software routines executed on a single computing node, or as distributed services across multiple computing nodes or environments. Additionally, any of the foregoing systems, modules, engines, interfaces, or components may utilize one or more application programming interfaces (APIs) to communicate with external systems, services, or repositories, and to receive or transmit data as part of the operations described in FIG. 1 through FIG. 7.

Figure 8:
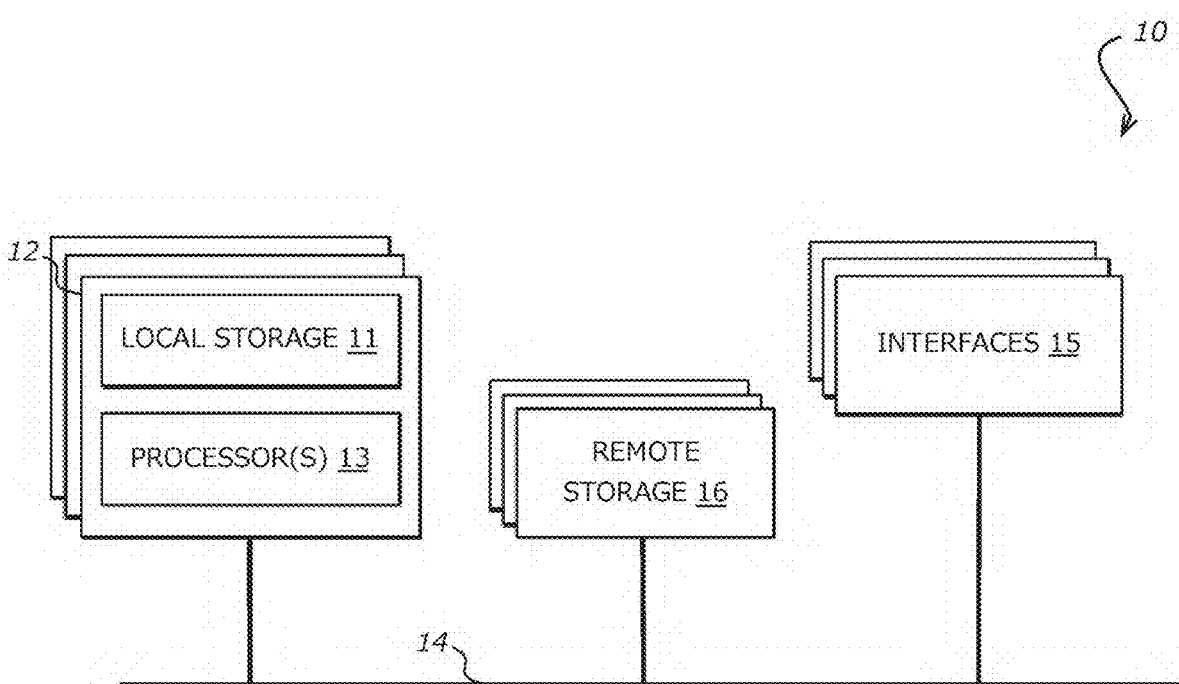
FIG. 8 illustrates an example device-level architecture that can support various embodiments.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
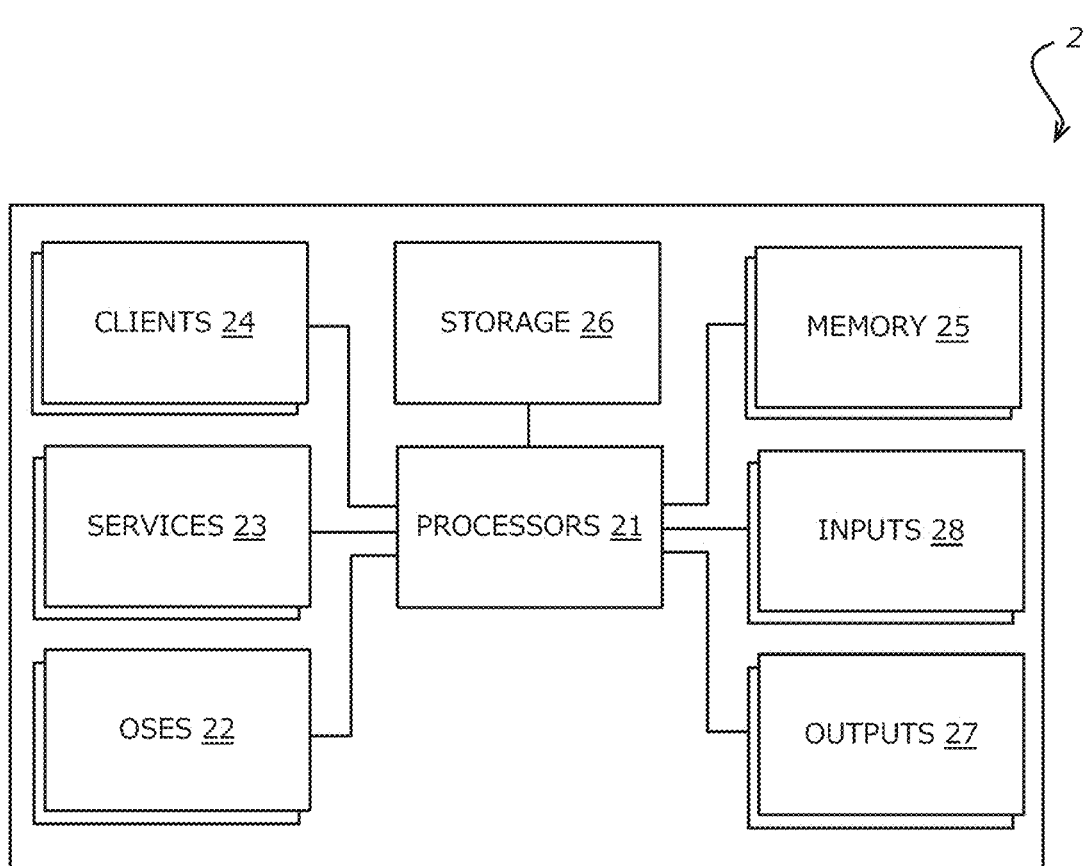
FIG. 9 illustrates components of a computing device in accordance with various embodiments.

In some embodiments, systems may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touch-pad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
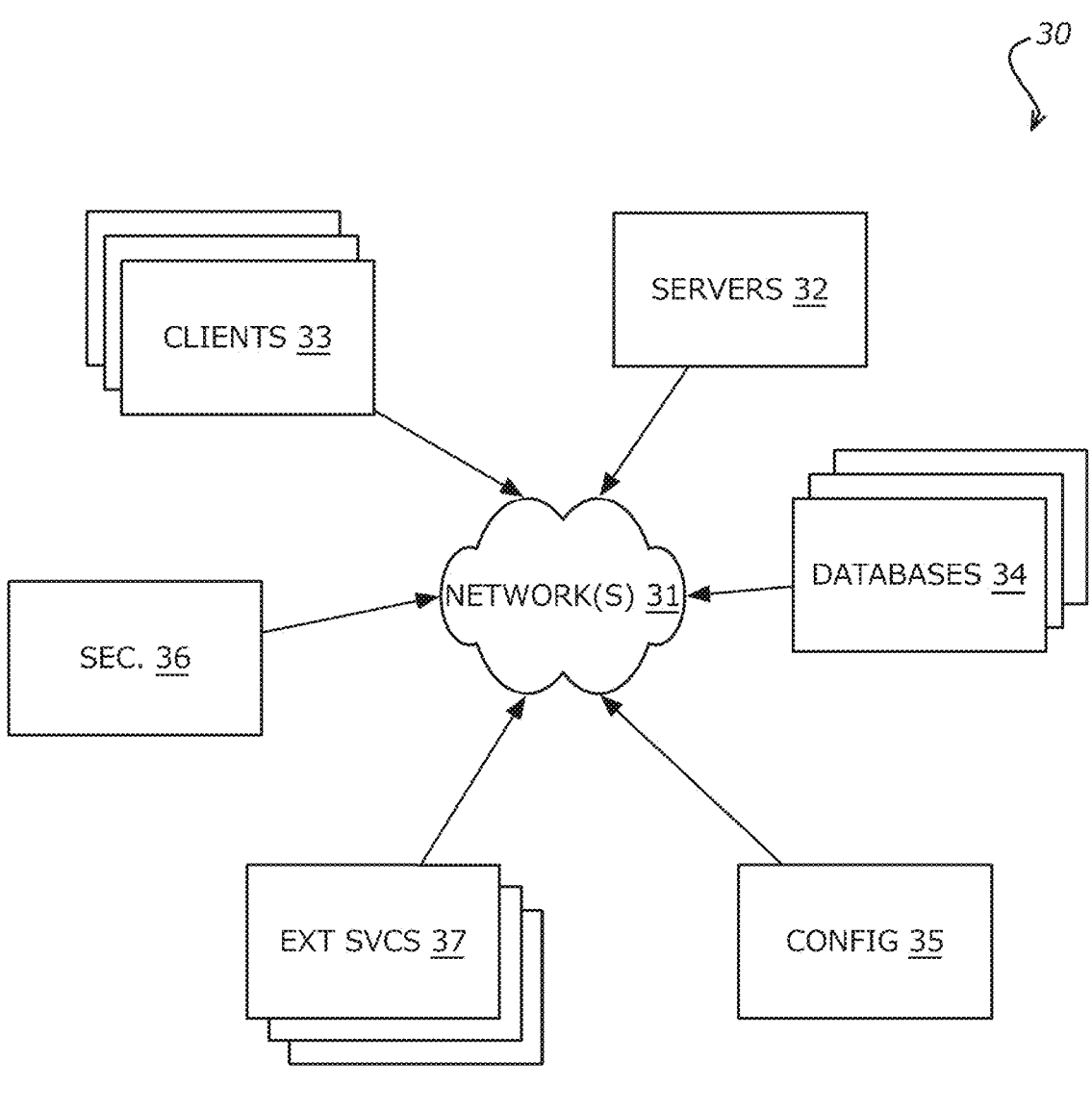
FIG. 10 illustrates an exemplary architecture of a system in accordance with various embodiments.

In some embodiments, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional infor-mation, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain infor-mation stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more data-bases 34 may be used or referred to by one or more embodiments. It should be understood by one having ordi-nary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data stor-age technology such as those referred to in the art as "NoSQL" (for example, HADOOP CASSANDRA™, GOOGLE BIGTABLE™, and so forth). In some embodi-ments, variant database architectures such as column-ori-ented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a par-ticular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common infor-mation technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 11:
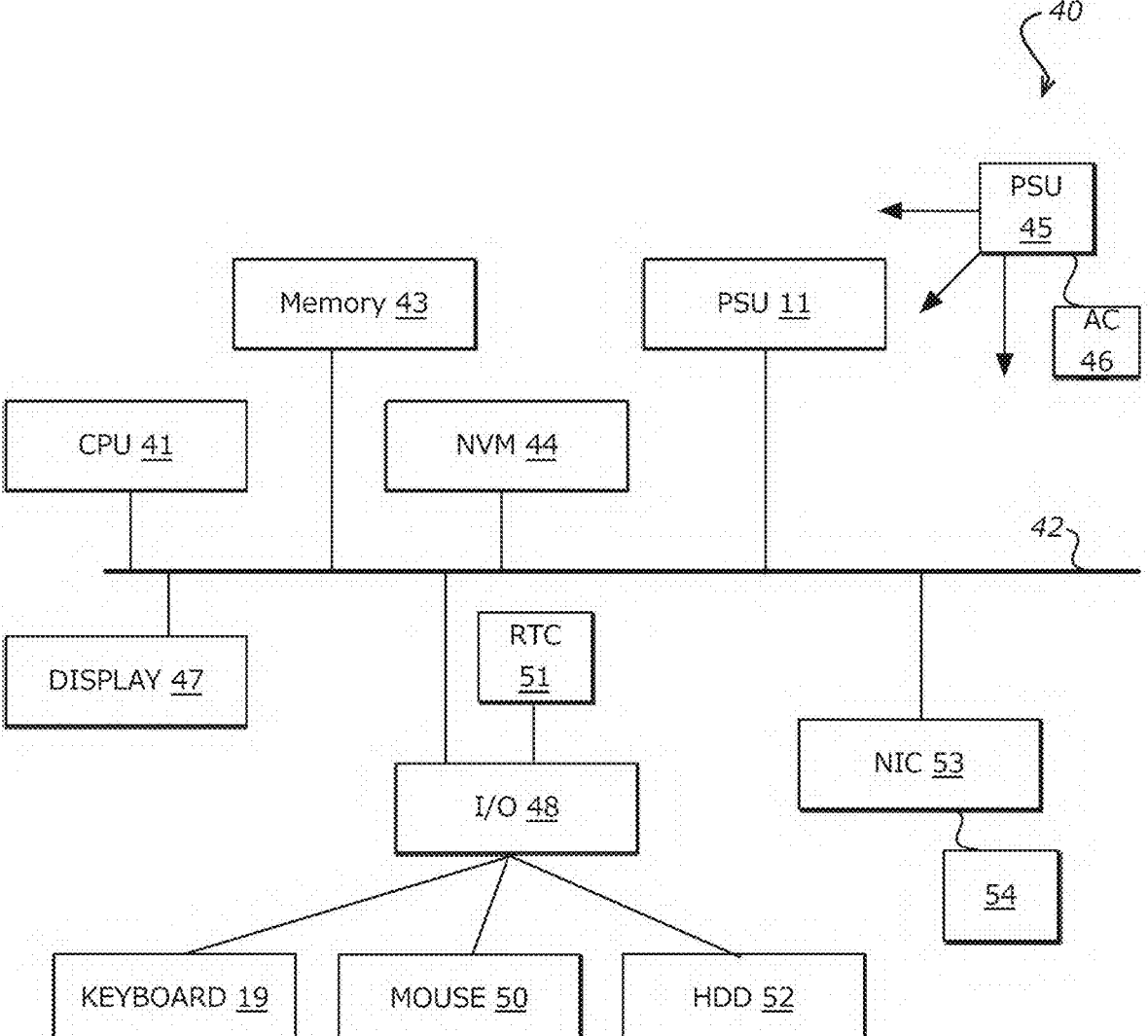
FIG. 11 illustrates components of a computing device in accordance with various embodiments.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is con-nected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illus-trated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in auto-mobiles, or other integrated hardware devices).

In various embodiments, functionality for implementing systems or methods of various embodiments may be dis-tributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and β is false (or not present), A is false (or not present) and β is true (or present), and both A and β are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for augmenting semantic search with structured knowledge constraints, comprising:

receiving a plurality of content segments, individual content segments representing at least one source document;

processing the plurality of content segments through a dual-indexing pipeline to generate a vector embedding for each content segment;

extracting structured relationships between the plurality of content segments;

maintaining parallel data structures, based on generated vector embeddings and extracted structured relationships, the parallel data structures comprising a vector index that stores the generated vector embeddings for similarity-based retrieval and a graph structure that stores the extracted structured relationships as traversable connections used to impose the structured knowledge constraints on semantic retrieval;

receiving a query to augment the semantic search;

initiating a first retrieval path to search the vector index to identify semantically similar segments;

initiating a second retrieval path to traverse the graph structure to identify contextually connected segments, wherein the first retrieval path and the second retrieval path are parallel retrieval paths;

executing a constraint resolution process comprising:

cross-referencing the semantically similar segments identified by the first retrieval path against the contextually connected segments identified by the second retrieval path;

adjusting relevance scores for the semantically similar segments based at least in part on presence or absence of corresponding graph connections; and generating a unified ranking that prioritizes content segments validated by both the first retrieval path and the second retrieval path;

wherein the constraint resolution process filters the semantically similar segments identified by the first retrieval path through the graph structure to apply the structured knowledge constraints.

2. The computer-implemented method of claim 1, wherein processing the plurality of content segments through the dual-indexing pipeline comprises:

parsing the at least one source document to extract the plurality of content segments;

generating the vector embeddings by encoding each content segment through a neural language model;

identifying the structured relationships between the content segments by detecting at least one of reference patterns, contextual indicators, or semantic dependencies; and creating bidirectional links that capture at least one of relationship type, strength, or contextual metadata.

3. The computer-implemented method of claim 1, further comprising an automated query construction mechanism that:

monitors user interactions with one or more displayed content segments;

captures a selected content segment and an interaction context;

generates a constructed query by combining the selected content segment with one or more contextual prefixes and one or more hidden instruction parameters; and routes the constructed query through the parallel retrieval paths without requiring manual query formulation.

4. The computer-implemented method of claim 3, wherein the one or more hidden instruction parameters comprise:

retrieval constraints that limit search scope based on the interaction context;

formatting directives that structure a response according to predefined templates; and personalization filters that adjust response complexity based on one or more stored user attributes.

5. The computer-implemented method of claim 3, wherein the automated query construction mechanism further comprises:

detecting one or more interaction types from one or more user interface events;

selecting one or more query templates matched to an interaction type;

extracting one or more context windows associated with the selected content segment; and injecting interaction-specific parameters into the constructed query.

6. The computer-implemented method of claim 1, wherein traversing the graph structure comprises:

identifying entry nodes in the graph structure that match one or more query terms;

traversing connections from the entry nodes to other nodes in the graph structure based on edge weights and relationship types;

accumulating traversal scores at each visited node; and selecting content segments corresponding to nodes having a highest accumulated traversal scores.

7. The computer-implemented method of claim 1, wherein the constraint resolution process comprises:

creating a connectivity matrix between the semantically similar segments identified by the first retrieval path and the contextually connected segments identified by the second retrieval path;

calculating a validation score for each semantically similar segment based on a number of connections and edge weights representing relationship strength in the connectivity matrix;

applying a decay function to a similarity score for each semantically similar segment, the decay function being inversely proportional to a corresponding validation score; and re-ranking the semantically similar segments using adjusted similarity scores.

8. The computer-implemented method of claim 1, further comprising a response synthesis pipeline that:

retrieves at least a portion of a source document corresponding to each content segment prioritized by the unified ranking;

extracts relationship paths between the content segments from the graph structure;

assembles a context package containing the content segments and their relationships;

processes the context package through a language model to generate a coherent response; and annotates the coherent response with source references linked to specific content segments.

9. The computer-implemented method of claim 1, wherein the graph structure stores structured relationships, each structured relationship comprising multiple attribute dimensions including:

a relationship category that defines a type of connection;

a directional indicator that specifies a direction of a structured relationship between content segments;

a strength metric that quantifies connection relevance; and a contextual annotation that describes a contextual aspect of the structured relationship.

10. The computer-implemented method of claim 1, further comprising a caching layer that:

stores results of graph traversals previously executed for prior queries;

maintains pre-computed paths between nodes in the graph structure that are accessed in response to queries matching a previously received query;

caches unified rankings for queries matching the previously received query; and invalidates cached entries in response to updates to the graph structure.

11. The computer-implemented method of claim 1, wherein maintaining parallel data structures comprises:

synchronizing updates between the vector index and the graph structure upon receipt of at least one additional content segment processed through the dual-indexing pipeline;

propagating at least one deletion across the vector index and the graph structure to maintain structural and referential consistency;

re-indexing the vector index in response to one or more modifications that exceed a defined threshold condition; and performing validation at predetermined intervals to verify alignment between the vector index and the graph structure.

12. The computer-implemented method of claim 1, further comprising a multi-service orchestration layer that:

distributes processing of the query across a plurality of service endpoints;

coordinates at least one search operation on the vector index using dedicated vector-processing hardware;

routes traversal of the graph structure to graph-optimized processors;

aggregates one or more results produced by the plurality of service endpoints executing the parallel retrieval paths;

detects one or more service execution failures associated with the plurality of service endpoints; and invokes one or more fallback mechanisms in response to the one or more service execution failures.

13. The computer-implemented method of claim 1, wherein the extracted structured relationships comprise:

explicit references, individual explicit references indicating that a first content segment directly cites a second content segment;

implicit connections between content segments, individual implicit connections identified based on semantic analysis;

hierarchical relationships that define parent-child relationships between content segments; and cross-references that link content segments associated with different source documents.

14. The computer-implemented method of claim 1, further comprising a state management system that:

tracks a plurality of query and response pairs, each query and response pair associated with a unique identifier;

stores one or more interaction contexts associated with the plurality of query and response pairs to maintain session continuity;

enables retrieval of a specific query and response pair based on the unique identifier associated with the specific query and response pair; and maintains one or more annotation layers associated with the specific query and response pair.

15. The computer-implemented method of claim 1, wherein generating the unified ranking comprises:

normalizing the relevance scores associated with the semantically similar segments and the contextually connected segments to a shared numerical range;

applying a weighted combination of normalized relevance scores, wherein one or more weights are selected based at least in part on one or more characteristics of the query;

applying one or more tie-breaking rules in response to two or more content segments having equivalent weighted relevance scores; and selecting a set of top-ranked content segments that includes a diversity constraint based on one or more content segment attributes.

16. The computer-implemented method of claim 1, further comprising an incremental update mechanism that:

processes one or more new content segments through the dual-indexing pipeline to generate one or more additional vector embeddings and to extract one or more additional structured relationships;

identifies one or more potential structured relationships between the one or more new content segments and one or more previously processed content segments;

updates the graph structure to incorporate the one or more additional structured relationships;

updates the vector index by reindexing one or more portions of a vector space associated with the one or more additional vector embeddings; and invalidates one or more cached entries associated with one or more traversal paths impacted by the graph structure.

17. The computer-implemented method of claim 1, wherein initiating the first retrieval path and the second retrieval path in parallel comprises executing search operations against the vector index and traversal operations against the graph structure concurrently; and wherein executing the constraint resolution process further comprises:

applying one or more filtering operations to the content segments identified by the first retrieval path based on the structured relationships associated with the content segments identified by the second retrieval path;

generating the unified ranking based on one or more comparisons of retrieval results produced by the first retrieval path and the second retrieval path; and processing a plurality of queries using the dual-indexing pipeline and the constraint resolution process without requiring modification of data structures maintained across different query types.

18. The computer-implemented method of claim 1, further comprising a feedback incorporation mechanism that:

receives one or more user interaction signals associated with content segments included in the unified ranking;

identifies one or more usage patterns based on the one or more user interaction signals, the one or more usage patterns comprising one or more indications of selection or rejection of individual content segments;

modifies one or more edge weights associated with one or more structured relationships in the graph structure based on the one or more usage patterns; and adjusts one or more constraint resolution parameters used during execution of the constraint resolution process based on the one or more usage patterns.

19. The computer-implemented method of claim 1, wherein the vector index and the graph structure are distributed across a plurality of storage nodes, distribution comprising:

implementing one or more partitioning strategies that co-locate content segments and corresponding structured relationships within individual storage nodes;

replicating the vector index and the graph structure across a subset of the plurality of storage nodes to provide fault tolerance;

distributing queries associated with the vector index and the graph structure across the plurality of storage nodes based on one or more load balancing policies; and synchronizing updates to the vector index and the graph structure across the plurality of storage nodes based on one or more consistency protocols.

20. A computer system for augmenting semantic search with structured knowledge constraints, comprising:

one or more processors; and a non-transitory computer-readable medium storing instructions that, when executed by the one or more processors, cause the computer system to:

receive a plurality of content segments, individual content segments representing at least one source document;

process the plurality of content segments through a dual-indexing pipeline to generate a vector embedding for each content segment;

extract structured relationships between the plurality of content segments;

maintain parallel data structures, based on generated vector embeddings and extracted structured relationships, the parallel data structures comprising a vector index that stores the generated vector embeddings for similarity-based retrieval and a graph structure that stores the extracted structured relationships as traversable connections used to impose the structured knowledge constraints on semantic retrieval;

receive a query to augment the semantic search;

initiate a first retrieval path to search the vector index to identify semantically similar segments;

initiate a second retrieval path to traverse the graph structure to identify contextually connected segments, wherein the first retrieval path and the second retrieval path are parallel retrieval paths;

execute a constraint resolution process comprising:

cross-reference the semantically similar segments identified by the first retrieval path against the contextually connected segments identified by the second retrieval path;

adjust relevance scores for the semantically similar segments based at least in part on presence or absence of corresponding graph connections; and generate a unified ranking that prioritizes content segments validated by both the first retrieval path and the second retrieval path;

wherein the constraint resolution process filters the semantically similar segments identified by the first retrieval path through the graph structure to apply the structured knowledge constraints.

* * * * *